United States Patent
Ikeda et al.

(10) Patent No.: US 6,937,360 B1
(45) Date of Patent: Aug. 30, 2005

(54) IMAGE FORMING METHOD AND APPARATUS WHICH CAN PERFORM OUTPUT OPERATION SUITABLE FOR RECEIVED IMAGE AND COMMUNICATION APPARATUS USING THE SAME

(75) Inventors: Atsushi Ikeda, Toride (JP); Koichi Matsumoto, Tokyo (JP); Masaaki Inde, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 09/606,020

(22) Filed: Jun. 29, 2000

(30) Foreign Application Priority Data

Jun. 30, 1999  (JP) ................................. 11-186729
Jun. 30, 1999  (JP) ................................. 11-186731
Jul. 30, 1999  (JP) ................................. 11-216751

(51) Int. Cl.$^7$ .......................... G06F 13/00; G06F 15/00
(52) U.S. Cl. ......................... 358/1.4; 358/1.15; 347/43; 347/115; 347/117
(58) Field of Search ............................. 358/1.14, 1.8, 358/1.9, 1.15, 1.16, 471, 472, 498, 1.4; 400/120, 400/605, 703, 708; 347/3, 14, 43, 183, 115, 347/117

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,723,129 A | 2/1988 | Endo et al. | |
| 4,740,796 A | 4/1988 | Endo et al. | |
| 4,827,358 A | 5/1989 | Matsumoto | |
| 5,019,835 A | 5/1991 | Arahara et al. | |
| 5,041,843 A | 8/1991 | Tohyama et al. | |
| 5,138,345 A | 8/1992 | Tohyama et al. | |
| 5,530,792 A | 6/1996 | Ikeda et al. | |
| 5,606,355 A * | 2/1997 | Komatsu | 347/60 |
| 5,617,123 A | 4/1997 | Takaoka et al. | |
| 5,636,032 A * | 6/1997 | Springett | 358/296 |
| 5,742,306 A * | 4/1998 | Gompertz et al. | 347/43 |
| 5,801,846 A * | 9/1998 | Nobuta | 358/468 |

(Continued)

FOREIGN PATENT DOCUMENTS

JP  54-056847  5/1979

(Continued)

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

An image forming apparatus and a control method for the apparatus are disclosed. In this image forming apparatus which has a printing unit selectively using a desired one of a plurality of types of ink cartridges and can receive monochromatic and color facsimile images, appropriate ink remaining amount detection or appropriate received facsimile image printing control can be performed in accordance with the type of received image and the type of loaded cartridge. In receiving/printing monochromatic and color images, a received image is discriminated as a color or monochromatic image, and the type of cartridge currently loaded into an ink-jet printing unit capable of performing printing operation by selecting one of a plurality of printing capabilities is discriminated. In accordance with these discrimination results, control is performed to automatically print the received image using the printing unit or stored it in an image memory or the like.

15 Claims, 24 Drawing Sheets

U.S. PATENT DOCUMENTS

| | | | |
|---|---|---|---|
| 5,896,207 A * | 4/1999 | Tomida | 358/537 |
| 5,949,445 A * | 9/1999 | Aichi | 347/5 |
| 5,956,162 A * | 9/1999 | Nobuta | 358/500 |
| 5,971,519 A * | 10/1999 | Horikoshi | 347/16 |
| 6,000,779 A * | 12/1999 | Ng et al. | 347/24 |
| 6,027,199 A * | 2/2000 | Reed | 347/15 |
| 6,075,927 A * | 6/2000 | Sakai et al. | 358/1.9 |
| 6,086,193 A * | 7/2000 | Shimada et al. | 347/86 |
| 6,089,772 A * | 7/2000 | Takemura et al. | 400/625 |
| 6,219,153 B1 * | 4/2001 | Kawanabe et al. | 358/1.16 |
| 6,338,539 B1 * | 1/2002 | Kobayashi et al. | 347/23 |
| 6,462,830 B1 * | 10/2002 | Negishi | 358/1.12 |
| 6,557,963 B1 * | 5/2003 | Ikeda | 347/14 |

FOREIGN PATENT DOCUMENTS

| | | |
|---|---|---|
| JP | 59-123670 | 7/1984 |
| JP | 59-138461 | 8/1984 |
| JP | 60-071260 | 4/1985 |
| JP | 09-094981 | 4/1997 |
| JP | 10-006712 | 3/1998 |
| JP | 10-067127 | 3/1998 |

* cited by examiner

F I G. 20
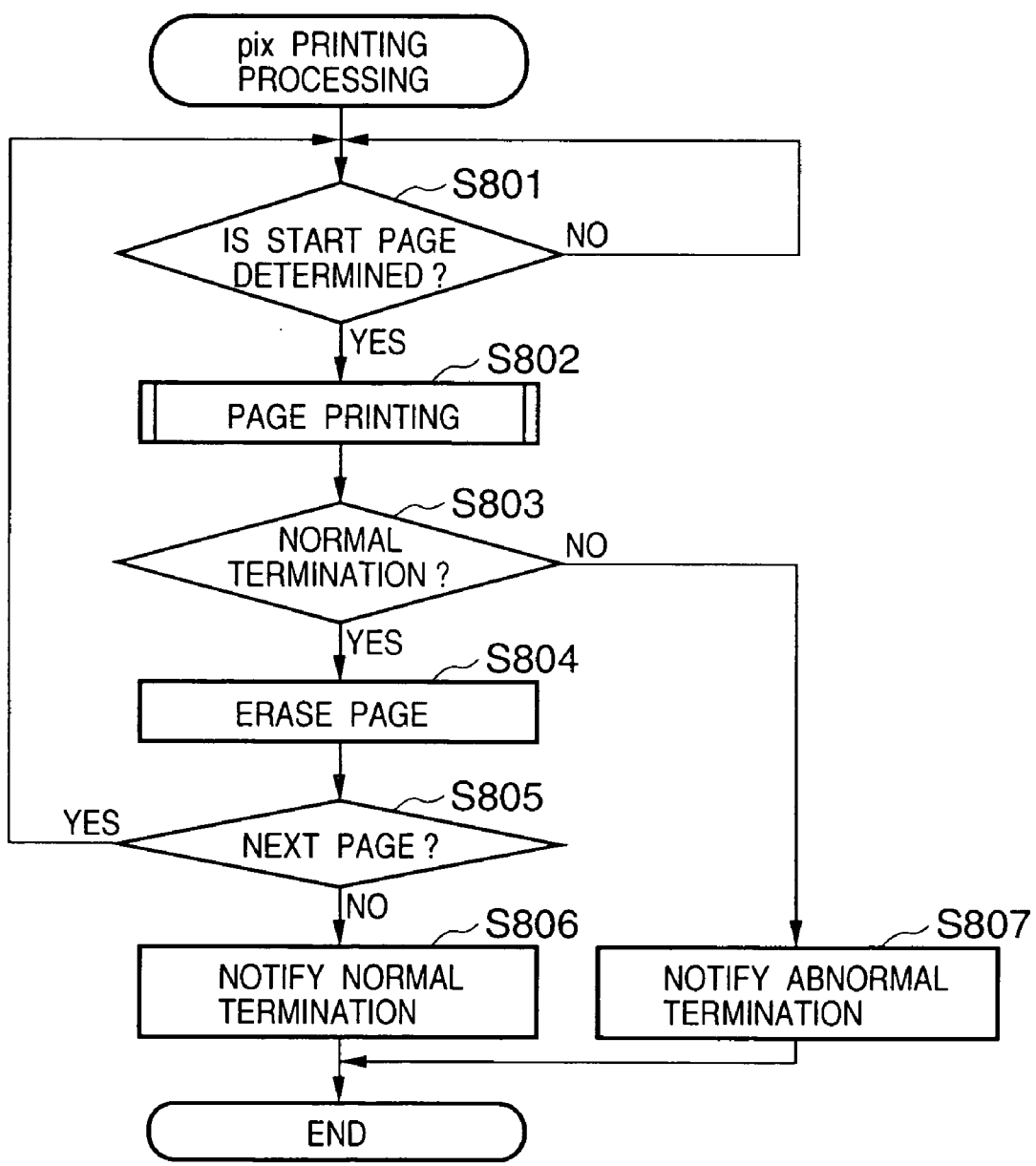

FIG. 23

| LOADED INK CARTRIDGE / RECEIVED IMAGE DATA | IMAGE MADE UP OF ONLY MONOCHROMATIC PAGES | COMPOSITE IMAGE MADE UP OF MONOCHROMATIC AND COLOR PAGES | IMAGE MADE UP OF ONLY COLOR PAGES |
|---|---|---|---|
| MONOCHROMATIC CARTRIDGE | MONOCHROMATIC PRINTING | COLOR PAGES ARE ALSO PRINTED IN MONOCHROME | COLOR PAGES ARE ALSO PRINTED IN MONOCHROME |
| COLOR CARTRIDGE | MONOCHROMATIC PRINTING | MONOCHROMATIC/COLOR PRINTING | COLOR PRINTING |
| LIGHT-COLOR CARTRIDGE | DISPLAY "REPLACE CARTRIDGE IN USE WITH MONOCHROMATIC CARTRIDGE" | DISPLAY "REPLACE CARTRIDGE IN USE WITH COLOR CARTRIDGE" | PRINT COLOR PAGES WITH LIGHT-COLORED INKS |

IMAGE FORMING METHOD AND APPARATUS WHICH CAN PERFORM OUTPUT OPERATION SUITABLE FOR RECEIVED IMAGE AND COMMUNICATION APPARATUS USING THE SAME

FIELD OF THE INVENTION

The present invention relates to an image forming method and apparatus, a communication apparatus such as a facsimile apparatus using them, and a printing control method for the communication apparatus. More particularly, the present invention relates to an image forming method and apparatus which can form both a monochromatic image and a multivalue (including binary value) color image, a communication apparatus, and a printing control method for the communication apparatus.

BACKGROUND OF THE INVENTION

Some conventional apparatuses are designed to perform binary monochromatic facsimile transmission on the basis of the facsimile transmission procedure defined by the ITU-T recommendation T.30 and also perform color facsimile transmission according to a unique procedure.

Color facsimile transmission procedures have recently been standardized by ITU-T recommendations.

Under the circumstances, there have been proposed apparatuses capable of performing monochromatic and color facsimile transmission on the basis of the standardized facsimile transmission procedures.

Some ink-jet printers that can be applied as the printing units of facsimile apparatuses are designed to allow a user to select one of a plurality of types of cartridges, e.g., a monochromatic cartridge dedicated to monochromatic printing, a color cartridge which has yellow, magenta, cyan, and black inks and is capable of performing monochromatic and color printing, and a color cartridge for photographic printing, which contains inks of special compositions to print photographic images and the like more sharply.

Many facsimile apparatuses have already been proposed, each of which has a printing unit capable of monochromatic facsimile transmission and allowing a user to select a monochromatic or color cartridge as described above. In such an apparatus, when a monochromatic facsimile-received image is printed, the remaining amount of black ink is preferably detected to check whether the image is normally printed, as proposed in, for example, Japanese Patent Laid-Open No. 9-94981. An apparatus has also been proposed, in which, if the lack of black ink is detected on the basis of the result of black ink remaining amount detection, subsequent monochromatic facsimile-received images are not automatically printed but are stored in an image memory in the facsimile apparatus (memory alternate reception).

Any conventional facsimile apparatus which can perform monochromatic and color transmissions and has a printing unit that allows a user to select a monochromatic or color cartridge as described above is not designed to detect only the remaining amount of black ink upon receiving a monochromatic facsimile image and automatically printing the image, with a color cartridge being loaded, and detect the remaining amounts of inks of a plurality of colors required for color printing upon receiving a color facsimile image and automatically printing the image.

There has not been any apparatus either, in which when a color facsimile image is received while, for example, only yellow ink required to print a color image has run out, so-called memory alternate reception is performed, but when a monochromatic facsimile image is received in the same condition, automatic printing is performed by using black ink.

The following problems also arise in a facsimile apparatus of this type.

Assume that a color facsimile image is received while a cartridge dedicated to monochromatic printing is loaded into the printing unit by the user. In this case, if the received image is automatically printed, a so-called monochromatic gray-scale image is obtained instead of a color image.

Assume that a monochromatic facsimile image is received while a color cartridge for photographic printing, which is more expensive than a general color cartridge, is loaded into the printing unit by the user. In this case, if the received image is automatically printed, the running cost increases as compared with a case wherein the cartridge dedicated to monochromatic printing is used, thereby imposing a burden on the user.

In order to solve this problem, there has been proposed a method of temporarily receiving a received image in a memory in a facsimile apparatus and allowing a user to manually print the image.

According to this method, however, the user must manually print each facsimile-received image, resulting in a heavy load on the user when he/she frequently receives facsimile images.

The present invention has been made in consideration of the prior art described above, and has as its object to provide an image forming apparatus which has a printing unit that allows a user to select a desired one of, e.g., a monochromatic cartridge, color cartridge, and color cartridge for photographic printing, and can receive monochromatic and color images, a communication apparatus using the image forming apparatus, and a printing control method.

It is another object of the present invention to provide an image forming apparatus which has an image forming unit that allows a user to select, e.g., a cartridge dedicated to monochromatic printing, cartridge for color printing, or cartridge for photographic printing, and can receive monochromatic and color images, and a communication apparatus using the image forming apparatus, which automatically print received images, where possible, while preventing received color images from being unintentionally converted into monochromatic images and reducing running cost by suppressing printing of received images using expensive inks.

It is still another object of the present invention to provide an apparatus which can notify a user of an inability to perform automatic printing when a received image cannot be automatically printed.

SUMMARY OF THE INVENTION

In order to achieve the above objects, an image forming apparatus of the present invention has the following arrangement.

There is provided an image forming apparatus including a printing unit capable of receiving and printing monochromatic and color images and performing printing operation by selecting one of a plurality of printing capabilities, characterized by comprising first discrimination means for discriminating whether a received image is a color or monochromatic image, second discrimination means for discriminating a printing capability of the printing unit, storage means for storing the received image, and control means for performing control, on the basis of the discrimination results obtained by the first and second discrimination means, to automatically print the received image by using the printing unit or store the received image in the storage means.

The printing unit preferably comprises an ink-jet printhead.

In addition, the ink-jet printhead preferably includes a first printhead for monochromatic printing and a second printhead for color printing. Preferably, (1) the first printhead and an ink tank containing a black ink constitute a first cartridge, (2) the second printhead and a plurality of ink tanks respectively containing black, cyan, magenta, and yellow inks constitute a second cartridge, and (3) the second printhead and a plurality of ink tanks respectively containing black, cyan, magenta, and yellow inks which differ in density from the inks contained in the second cartridge and are suitable for high-quality color image printing constitute a third cartridge.

In this arrangement, the printing unit preferably includes loading means into which one of the first to third cartridges is loaded, and detection means for detecting the presence/absence of ink remaining in the cartridge loaded into the loading means. In this case, the second discrimination means discriminates the type of loaded cartridge.

Preferably, the printing unit further comprises detection control means for controlling the detection means to detect the presence/absence of ink remaining in the second cartridge upon selecting ink whose presence/absence is to be detected in accordance with the first discrimination result when it is discriminated on the basis of the discrimination result obtained by the second discrimination means that the second cartridge is loaded into the loading means.

The control means preferably performs control to store the received image in the storage means in accordance with the detection result obtained by the detection means.

If the first discrimination means discriminates reception of a monochromatic image, and the second discrimination means discriminates that the third cartridge is loaded into the loading means, control may be performed to store the received image in the storage means. If the first discrimination means discriminates reception of a color image, and the second discrimination means discriminates that the first or third cartridge is loaded into the loading means, control may be performed to store the received image in the storage means. If the first discrimination means discriminates reception of a monochromatic image, and the second discrimination means discriminates that the second cartridge is loaded into the loading means, while the detection means detects that no black ink is left, control may be performed in accordance with a condition set in the apparatus in advance to print the received image by using process black or store the received image in the storage means.

The ink-jet printhead preferably comprises an electrothermal transducer for generating heat energy supplied to ink in order to discharge the ink by using the heat energy.

Preferably, the apparatus further comprises instruction means for instructing the printing unit to print a received image stored in the storage means or holding means for holding information for identifying each page of the received image as a monochromatic or color image.

According to another aspect of the present invention, there is provided an image forming apparatus including a printing unit capable of receiving and printing monochromatic and color images and performing printing operation by selecting one of a plurality of printing capabilities, characterized by comprising reception means for receiving the image from a communication line, first discrimination means for discriminating whether the received image is a color or monochromatic image, second discrimination means for discriminating a printing capability of the printing unit, storage means for storing the received image, and control means for performing control, on the basis of the discrimination results obtained by the first and second discrimination means, to automatically print the received image by using the printing unit or store the received image in the storage means.

According to still another aspect of the present invention, there is provided a printing control method of performing reception/printing control on monochromatic and color images, characterized by comprising the reception step of receiving the image from a communication line, the first discrimination step of discriminating whether the received image is a color or monochromatic image, the second discrimination step of discriminating a currently selected printing capability of a printing unit capable of selecting one of a plurality of printing capabilities and printing an image, and the control step of performing control, on the basis of the discrimination results obtained by in the first and second discrimination steps, to automatically print the received image by using the printing unit or store the received image in an image memory.

According to still another aspect of the present invention, there is provided a computer-readable medium storing a program for executing reception/printing control on monochromatic and color images, characterized in that the program comprises a code for executing a reception process of receiving the image from a communication line, a code for executing a first discrimination process of discriminating whether the received image is a color or monochromatic image, a code for executing a second discrimination process of discriminating a currently selected printing capability of a printing unit capable of selecting one of a plurality of printing capabilities and printing an image, and a code for executing a control process, on the basis of the discrimination results obtained in the first and second discrimination processes, to automatically print the received image by using the printing unit or store the received image in an image memory.

With the above arrangement, according to the present invention, in receiving/printing images like monochromatic and color images, a received image is discriminated as a color or monochromatic image, and the type of cartridge currently loaded into the printing unit capable of performing printing operation by selecting one of a plurality of printing capabilities is discriminated. In accordance with these discrimination results, control is performed to automatically print the received image using the printing unit or store it in an image memory or the like.

The objects of the present invention can also be achieved by an image forming apparatus which can receive both a monochromatic image and a color image and mount at least one of a plurality of types of image forming means, characterized by comprising image memory means capable of storing a received image, image attribute discrimination means for discriminating received images as monochromatic or color images in predetermined units, image attribute holding means for holding the discrimination result obtained by the image attribute discrimination means, received image output determination means for determining, on the basis of a combination of information held in the image attribute holding means and the type of mounted image forming means, whether to output a received image or store the image in the image memory means without outputting the image, and control means for controlling output operation of the mounted image forming means or controlling storage of the received image in the image memory means in accordance with the determination result obtained by the received image output determination means.

The objects of the present invention can also be achieved by an image forming method of forming an image from a received image constituted by a monochromatic image and/or a color image by using at least one of a plurality of types of image forming means, characterized by comprising the image attribute discrimination step of discriminating received images as monochromatic or color images in predetermined units, the image attribute holding step of holding the discrimination result obtained in the image attribute discrimination step, the received image output determination step of determining, on the basis of a combination of information held in the image attribute holding step and the type of mounted image forming means, whether to output a received image or store the image without outputting the image, and the control step of controlling output operation of the mounted image forming means or controlling storage of the received image.

The objects of the present invention can also be achieved by a communication apparatus which can receive both a monochromatic image and a color image and mount at least one of a plurality of types of image forming means, characterized by comprising image memory means capable of storing a received image, image attribute discrimination means for discriminating received images as monochromatic or color images in predetermined units, image attribute holding means for holding the discrimination result obtained by the image attribute discrimination means, received image output determination means for determining, on the basis of a combination of information held in the image attribute holding means and the type of mounted image forming means, whether to output a received image or store the image in the image memory means without outputting the image, and control means for controlling output operation of the mounted image forming means or controlling storage of the received image in the image memory means in accordance with the determination result obtained by the received image output determination means.

The objects of the present invention can also be achieved by a control method for a communication apparatus which can receive both a monochromatic image and a color image and mount at least one of a plurality of types of image forming means, characterized by comprising the image attribute discrimination step of discriminating received images as monochromatic or color images in predetermined units, the image attribute holding step of holding the discrimination result obtained in the image attribute discrimination step, the received image output determination step of determining, on the basis of a combination of information held in the image attribute holding step and the type of mounted image forming means, whether to output a received image or store the image without outputting the image, and the control step of controlling output operation of the mounted image forming means or controlling storage of the received image.

The objects of the present invention can also be achieved by a computer-readable storage medium storing a control program for an image forming apparatus which can receive both a monochromatic image and a color image, has image memory means for storing a received image, and can mount at least one of a plurality of types of image forming means, characterized in that the program comprises a code for executing an image attribute discrimination process of discriminating received images as monochromatic or color images in predetermined units, a code for executing an image attribute holding process of holding the discrimination result obtained in the image attribute discrimination process, a code for executing a received image output determination process of determining, on the basis of a combination of information held in the image attribute holding process and the type of mounted image forming means, whether to output a received image or store the image in the image memory means without outputting the image, and a code for executing a control process of controlling output operation of the mounted image forming means or controlling storage of the received image in the image memory means in accordance with the determination result obtained in the received image output determination process.

The objects of the present invention can also be achieved by a computer-readable storage medium storing an image forming program for forming an image from a received image constituted by a monochromatic image and/or a color image by using at least one of a plurality of types of image forming means, characterized in that the program comprises a code for executing an image attribute discrimination process of discriminating received images as monochromatic or color images in predetermined units, a code for executing an image attribute holding process of holding the discrimination result obtained in the image attribute discrimination process, a code for executing a received image output determination process of determining, on the basis of a combination of information held in the image attribute holding process and the type of mounted image forming means, whether to output a received image or store the image without outputting the image, and a code for executing a control process of controlling output operation of the mounted image forming means or controlling storage of the received image in accordance with the determination result obtained in the received image output determination process.

The objects of the present invention can also be achieved by an image forming apparatus which can receive both a monochromatic image and a color image and mount at least one of a plurality of types of image forming means, characterized by comprising image attribute discrimination means for discriminating a received image as a monochromatic or color image in units of pages, determination means for determining an attribute of one communication on the basis of the discrimination result obtained by the image attribute discrimination means, and control means for outputting the received image to output means asynchronously with a determination process performed by the determination means.

The objects of the present invention can also be achieved by an image forming method of forming an image from a received image constituted by a monochromatic image and/or a color image by using at least one of a plurality of types of image forming means, characterized by comprising the image attribute discrimination step of discriminating a received image as a monochromatic or color image in units of pages, the determination step of determining an attribute of one communication on the basis of the discrimination result obtained in the image attribute discrimination step, and the control step of outputting the received image to output means asynchronously with a determination process performed in the determination step.

The objects of the present invention can also be achieved by a computer-readable storage medium storing an image forming program for forming an image from a received image constituted by a monochromatic image and/or a color image by using at least one of a plurality of types of image forming means, characterized in that the program comprises a code for executing an image attribute discrimination process of discriminating a received image as a monochromatic or color image in units of pages, a code for executing a determination process of determining an attribute of one communication on the basis of the discrimination result obtained in the image attribute discrimination process, and a code for executing a control process of outputting the received image to output means asynchronously with a determination process performed in the determination process.

The objects of the present invention can also be achieved by an image forming apparatus characterized by comprising read means for reading an original by using an optical mechanism, printing means for printing the image read by the read means, cartridge type determination means for determining a type of loaded ink cartridge, discrimination means for discriminating whether the ink cartridge determined by the cartridge type determination means is an ink cartridge corresponding to the image read by the read means, and notification means for, when the discrimination means discriminates that no ink cartridge corresponding to the image read by the read means is loaded, notifying a user of corresponding information.

The objects of the present invention can also be achieved by an image forming apparatus characterized by comprising communication means capable of communication with a distant apparatus through a predetermined line, printing means for printing the image read by the communication means, cartridge type determination means for determining a type of loaded ink cartridge, discrimination means for discriminating whether the ink cartridge determined by the cartridge type determination means is an ink cartridge corresponding to the image received by the communication means, and notification means for, when the discrimination means discriminates that no ink cartridge corresponding to the image received by the communication means is loaded, notifying a user of corresponding information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, server to explain the principles of the invention

FIG. 20 is a flow chart showing the details of pix printing processing in FIG. 19;

FIG. 23 is a view showing printing operations and notification contents which are determined in accordance with combinations of received image data and loaded cartridges in the third embodiment.

DETAILED DESCRIPTION OF THE PREFERRED EMBODIMENTS

Preferred embodiments of the present invention will now be described in detail in accordance with the accompanying drawings.

Figure 1:
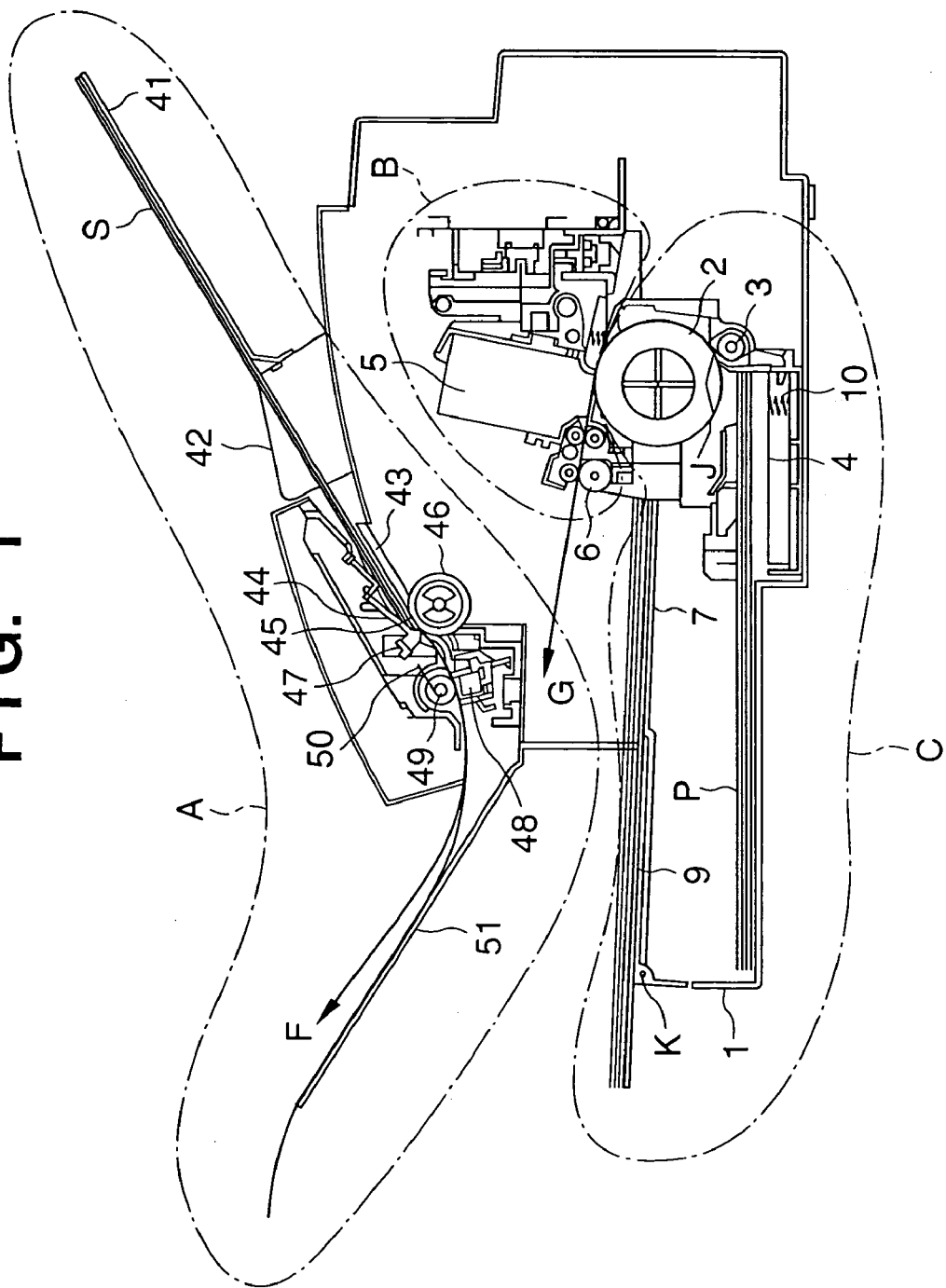
FIG. 1 is a cross-sectional view showing the arrangement of a facsimile apparatus including a printing unit for performing printing operation by using a printhead complying with an ink-jet scheme according to a representative embodiment of the present invention.

FIG. 1 is a cross-sectional view showing a structure of a facsimile apparatus comprising a printer, which performs printing by a printhead in accordance with an ink-jet printing method, according to a representative embodiment of the present invention. The facsimile apparatus can send/receive both monochrome and color facsimile data.

Hereinbelow, the general structure of the facsimile apparatus will be described with reference to FIG. 1. In FIG. 1, reference A denotes a reader which optically reads an original; B, a printer which performs printing in accordance with an ink-jet printing method; and C, a paper feeder which supplies print medium such as a print sheet P, set in a paper cassette, one sheet at a time, to the print sheet B.

First, the flow of operation in the printer P will be described. A conveyance path of the print sheet P is as shown by an arrow G. That is, the print sheet P set in the paper cassette I of the paper feeder C is picked up by a paper-feed roller 2 and a retard roller 3, and supplied to the printer B by the paper-feed roller 2. The printer B performs printing by discharging ink from a printhead 5 on the print sheet P, while it conveys the print sheet P in synchronization with the printing. When the printing is completed, the print sheet P is discharged by a discharge roller 6 onto a discharge stacker 7.

Next, the specific construction of the paper feeder C will be described.

In FIG. 1, the paper cassette 1 for containing a plural number of print sheets P has a middle plate 4 on which the print sheets P are placed. The middle plate 4 is biased upward from its back by a middleplate spring 10 provided opposite to the paper feed roller 2. In paper-feed stand-by status, the middle plate 4 has a structure which is pressed downward by a cam or the like and when the number of print sheets P has decreased or there is no print sheet P, additional print sheets can be easily set.

On the other hand, when a print signal is detected and paperfeed operation is started, the middle plate 4 pressed downward by the cam and the like is released, and the print sheet P is picked up by the paper-feed roller 2. The retard roller 3 is positioned opposite to the paper-feed roller 2, and is cooperated with the middle plate 4 to change the position of the print sheet P. Upon paper-feed operation, only the uppermost print sheet P, biased by the middle plate 4 and picked up by the paper-feed roller 2, is separately conveyed by cooperation at a unit J with the paper-feed roller 2. The separated print sheet P is supplied, while being held so as to sufficiently wind around the paper- feed roller 2, to the printer B.

Next, a discharge mechanism for the paper sheet P printed by the printer B will be described.

The print sheet P discharged by the discharge roller 6 is discharged onto the discharge stacker 7. The discharge stacker 7 has an auxiliary discharge tray 9 which rotates on a hinge K. In a case where the print sheet P is used from the shorter side as the top, the auxiliary discharge tray 9 is rotated so as to extend the stacker area of the discharge stacker 7 in the paper-discharge direction. The discharge stacker 7 also serves as a cover of the paper cassette 1. Note that the discharge stacker 7 and the auxiliary discharge tray 9 respectively have a plurality of ribs (not shown). The printed print sheet P is slid on the plurality of ribs, and sequentially accumulated.

Further, the flow of conveyance of an original S will be described.

A conveyance path for the originals is as shown by an arrow F in FIG. 1. In FIG. 1, the original S is placed, with the imageside surface being faced down, on an original tray 41. The original S placed on the original tray 41 is positioned by a slider 42 which is movable in an original-widthwise direction. As the original S is placed on the original tray 41, the original S is pressed by a pre-conveyance pressing piece 43 from an upper position via a pre-conveyance spring 44, and the original S is preliminarily conveyed in cooperation with a separation roller 46.

Then, preliminarily-conveyed originals S are separately conveyed from the bottom sheet in cooperation with a separation piece 45 and the separation roller 46, pressed downward by an ADF spring 47, one by one. Further, the separation roller 46 conveys the separated original S to a reading position. Thus, the image on the original S separately-conveyed by the separation roller 46 to the reading position is read by a reading sensor (photoelectric transducer) 48. A CS roller 49 is biased downward by a CS pressing spring 50 along a reading line of the reading sensor 48, to press the separately-conveyed original S against the reading line. Further, the CS roller 49 determines a reading speed for reading the original S in a sub-scanning direction (original-conveyance direction), and discharges the read original S. Finally, the discharged original S is stacked on the discharge tray 51. Note that the discharge tray 51 is detachable from the apparatus main body.

Figure 2:
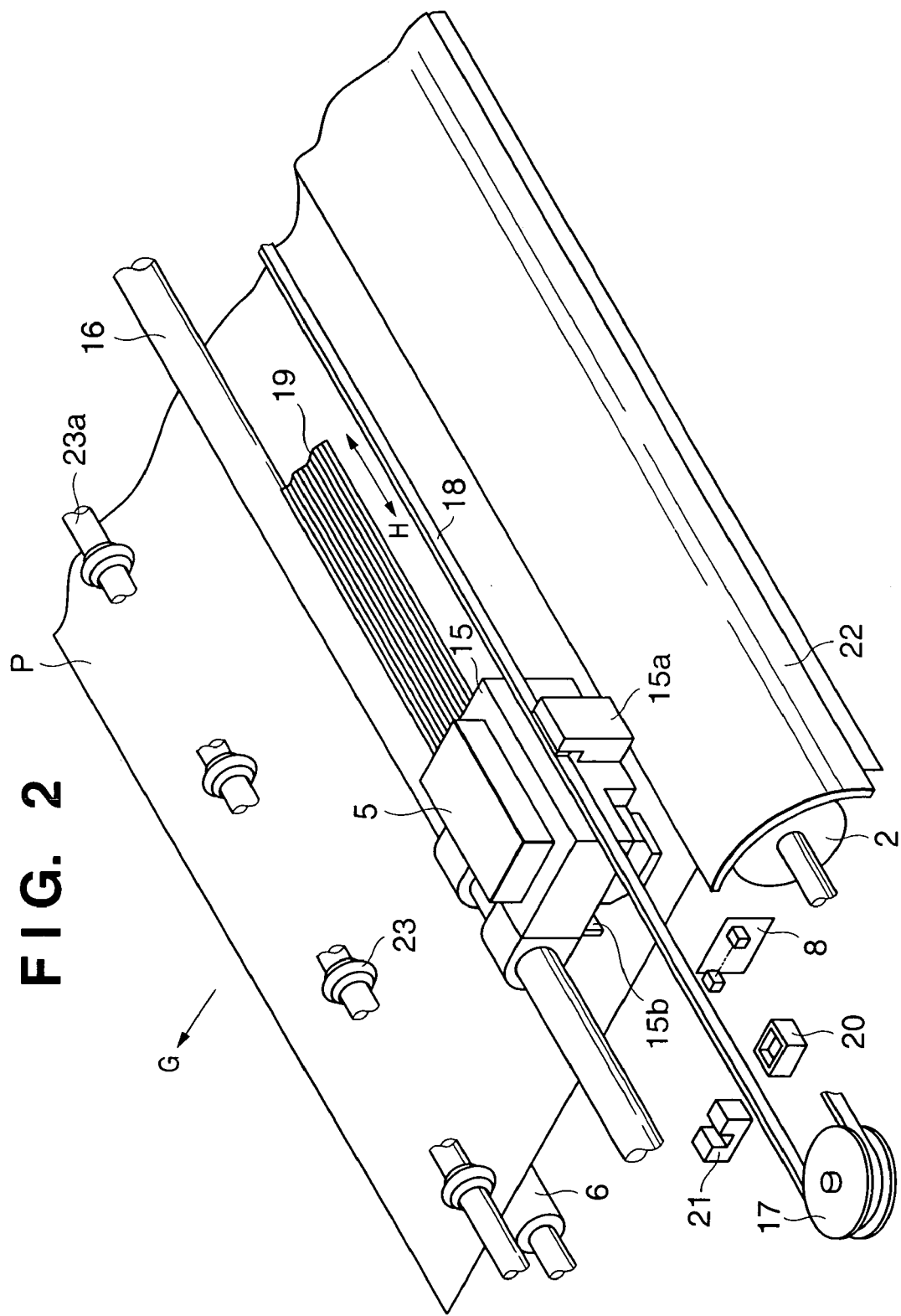
FIG. 2 is a perspective view showing the detailed arrangement of a printing unit B of the apparatus in FIG. 1.

FIG. 2 is a perspective view showing the detailed structure of the printer B. The printhead 5 in FIG. 2 is a cartridge-type printhead which is exchangeable for a new printhead when ink is exhausted. Alternatively, a cartridge-type printhead, which includes exchangeable ink tank(s) for (a) new tank(s) when ink is exhausted, can be used.

Next, a principle of ink discharge will be described below. Generally, the printhead comprises fine liquid discharge orifices, fluid channels and energy acting portions each provided at a part of each fluid channel, and energy-generating portions which generate liquid droplet formation energy to be acted on liquid at the energy-generating portions.

The energy-generating portion may employ a electromechanical transducer such as a piezoelectric device; otherwise, the energy-generating portion may irradiate an electromagnetic wave such as a laser beam upon a liquid so that electromagnetic energy is absorbed in the liquid, the liquid is heated up, and liquid droplets are discharged by action due to generated heat. Alternatively, the energy-generating portion may employ an electrothermal transducer to heat a liquid and discharge the liquid. Above all, a printhead using an ink-discharge method utilizing thermal energy can perform high-resolution printing, since the liquid-discharge orifices for discharging liquid droplets for printing can be arranged in high density.

A printhead using the electrothermal transducers as the energy-generating portions can be easily downsized. This printhead can fully utilize advantages of IC- manufacturing techniques and microprocess techniques, which have been greatly improved and are highly reliable in recent semiconductor-manufacturing. Further, the number of print nozzles in this printhead can be increased in one direction so as to extend the printing width or print nozzles in this printhead can be assembled to form a two-dimentional (two rows) nozzles array. For these reasons, this printhead is suitable for multi-nozzle manufacturing and highdensity assembling. Further, this printhead can be directed to mass production with low production costs.

Thus, the printhead, using electrothermal transducers as the energy-generating portions, manufactured via semiconductor-manufacturing processes, generally has ink channels corresponding to respective ink-discharge orifices and electrothermal transducers as means for forming discharge ink droplets. The electrothermal transducers impart thermal energy to ink filling the ink channels, and discharge the ink from corresponding ink-discharge orifices. The ink channels are connected to a common liquid chamber, and they are supplied with the ink from the common liquid chamber.

The construction of the printer B will be described with reference to FIG. 2.

In FIG. 2, a carriage 15 scans the printhead 5 in a direction (main-scanning direction; represented by an arrow H) orthogonal to the print-sheet P conveyance direction (sub-scanning direction; represented by arrow G direction in FIG. 1), while holding the printhead 5 with high precision. The carriage 15 is slidably held by a guide shaft 16 and a thrust member 15a. The scanning movement of the carriage 15 is performed by a pulley 17 driven by a carriage motor 30 (not shown in FIG. 2) and a timing belt 18. At this time, a print signal and electric power are supplied via a flexible cable 19 to the printhead 5 from an electric circuit of the apparatus main body. The printhead 5 and the flexible cable 19 are connected by press-connecting respective contact points with each other.

A cap 20 which functions as an ink receptor is provided at the home position of the carriage 15 of the printer B. The cap 20 moves up/down in accordance with necessity. When the cap 20 moves up, it comes into tight contact with the printhead 5 to cover the nozzle portion of the printhead 5, thus preventing evaporation of ink and attachment of extraneous matter (dust) to the nozzles.

In this apparatus, to arrange the printhead 5 and the cap 20 to positions relatively opposite to each other, a carriage home-position sensor 21 provided in the apparatus main body and a lightshield plate 15b provided at the carriage 15 are employed. The carriage home-position sensor 21 uses a photo interrupter. When the carriage 15 moves to a standby position, light irradiated from a part of the carriage home-position sensor 21 is interrupted by the lightshield plate 15b; at this time, it is detected that the printhead 5 and the cap 20 are at relatively opposite positions.

In FIG. 2, the print sheet P is fed from the lower side to the upper side in this drawing paper, and bent in a horizontal direction by the paper-feed roller 2 and the paper guide 22, then conveyed in the arrow G direction (subscanning direction). The paperfeed roller 2 and the discharge roller 6 are respectively driven by a drive motor (not shown); they operate, interlocked with scanning of the carriage 15, to convey the print sheet P in the subscanning direction with high precision. Further, rollers 23 comprising of water repellent material and having blade-like circumferential portions to contact the print sheet P are provided for paper feeding in the subscanning direction. The rollers 23 are arranged on a bearing member 23a opposite to the discharge roller 6, at a predetermined intervals. Even when the rollers 23 come into contact with unfixed image on the print sheet P immediately after printing, the rollers 23 guide and convey the print sheet P without influencing the image.

Figure 3:
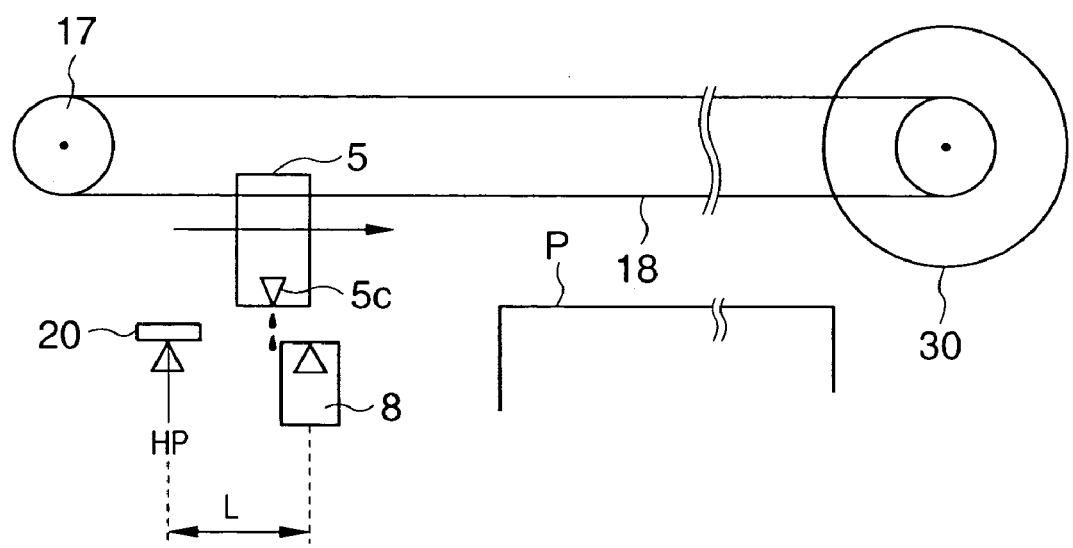
FIG. 3 is a view showing the detailed arrangement of a peripheral portion of a photosensor 8 of the printing unit B.
Figure 4:
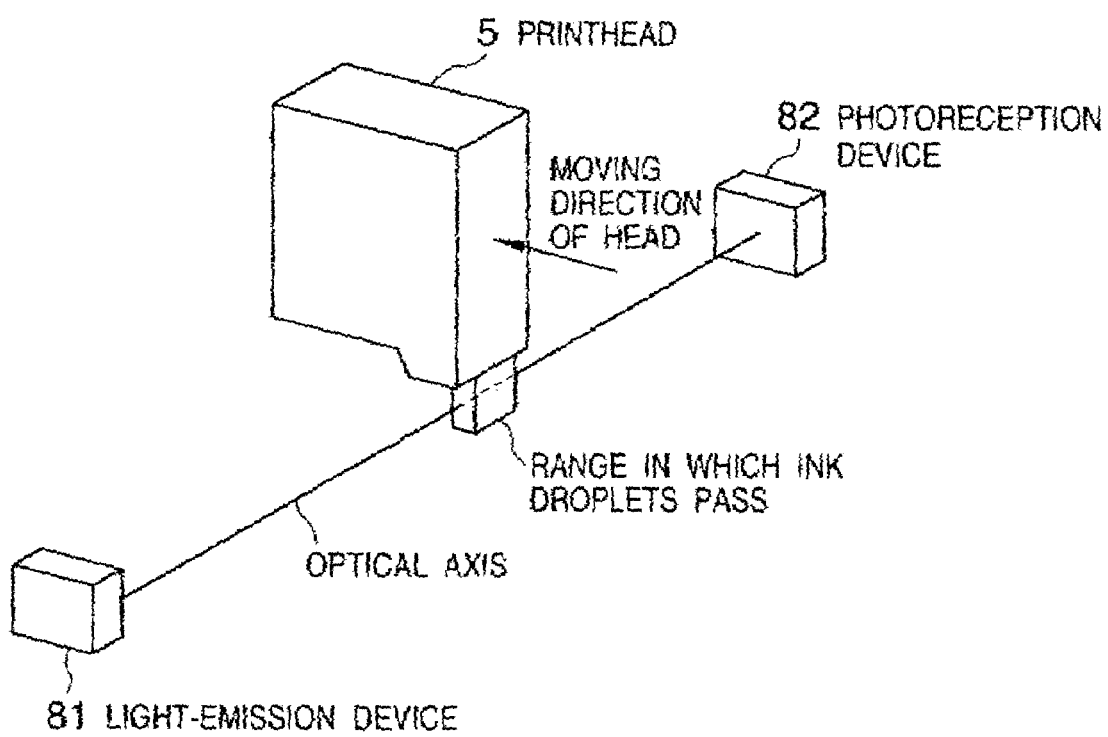
FIG. 4 is a view showing how ink blocks an optical axis of an infrared LED 81 as a light-emission device of the photosensor 8.

FIG. 3 is a schematic view showing a construction around a photosensor 8 of the printer B. As shown in FIG. 4, the photosensor 8 is provided between the cap 20 and the end of the print sheet P, at a position opposite to a nozzle array 5c of the printhead 5. The photosensor 8 optically detects ink droplets discharged by the nozzles of the printhead 5. When there is no ink in the printhead 5, the ink-exhausted status can be judged from output from the photosensor 8.

In the present embodiment, the photosensor 8 employs an infrared LED as a light-emission device, and a lens is integrally molded on light-emission surface of the LED, so as to irradiate light in a direction approximately parallel toward a photoreception device.

The photoreception device is a photo-transistor having a 0.7×0.7 mm hole formed of a mold member, on the optical axis, on its photoreception surface. That is, a detection range is narrowed to 0.7 mm in height and 0.7 mm in width between the photoreception device and the light-emission device. The optical axis connecting the light-emission device and the photoreception device is set to parallel to the nozzle array 5c of the printhead S. The interval between the light-emission device and the photoreception device is greater than the length of the nozzle array 5c of the printhead 5. When the optical axis and the position of the nozzle array 5c coincide, all ink droplets discharged from the nozzles of the printhead 5 pass the detection range between the light-emission device and the photoreception device. As the ink droplets pass the detection range, the ink droplets interrupt light from the light-emission side, and decrease light intensity to the photoreception side, thus the output from the photo-transistor as the photoreception device changes.

Similar to positioning of the printhead 5 and the cap 20, the carriage home-position sensor 21 provided in the apparatus main body is used to arrange the nozzle array 5c of the printhead 5 and the photosensor 8 at relatively opposite positions.

As shown in FIG. 3, this embodiment converts a distance (L), between the home position (HP) of the printhead 5 and a position on the optical axis of the photosensor 8, into a number of steps of a motor for driving the carriage 15, and sets in advance this number of steps of the motor as a constant in a control program to execute print operation. Thus, by moving the carriage 15 by a predetermined amount after detection of the home position, the nozzle array 5c of the printhead 5 and the optical axis of the photosensor 8 are precisely set at relatively opposite positions. As shown in FIG. 4, ink-discharge status detection is performed by moving the printhead 5 and discharging ink so as to interrupt a light beam from the infrared LED 81 (FIG. 4). If the discharged ink interrupts the light beam traveling to a photo-transistor 82, which is the photoreception device of the photosensor 8, it is judged that ink discharge is normally performed.

Figure 5:
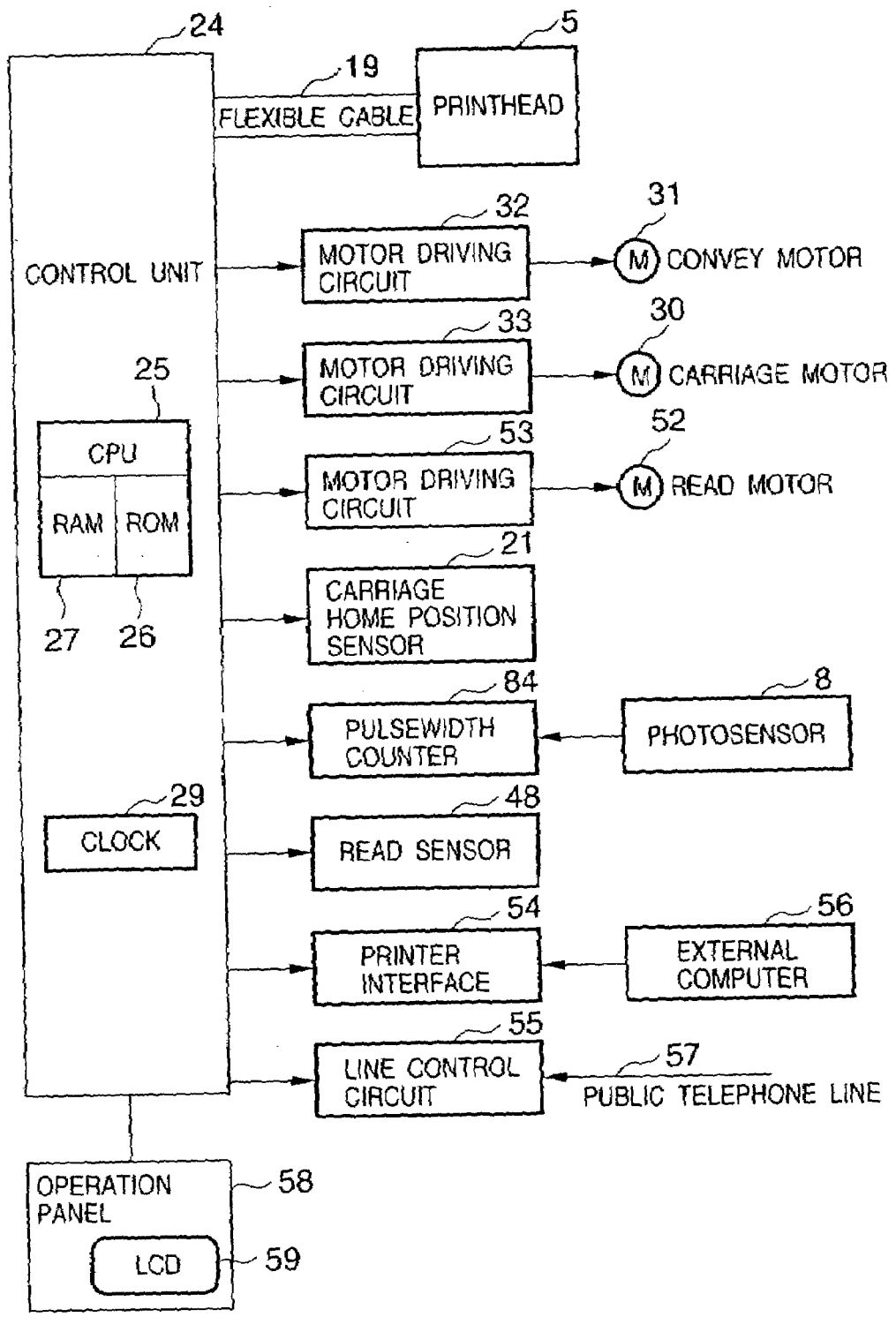
FIG. 5 is a block diagram showing the control arrangement of the facsimile apparatus in FIG. 1.

FIG. 5 is a block diagram showing a control construction of the facsimile apparatus in FIG. 1.

In FIG. 5, numeral 24 denotes a controller for controlling the overall apparatus. The controller 24 comprises a CPU 25, a ROM 26 in which control programs to be executed by the CPU 25 and various data, and several threshold values used in ink-discharge status detection to be described later are stored, and a RAM 27 used as a work area for execution of various processing by the CPU 25 and for temporarily storing various data.

As shown in FIG. 5, the printhead 5 is connected to the controller 24 via the flexible cable 19. The flexible cable 19 includes a control-signal line from the controller 24 to the printhead 5, and an image signal line. The output from the photosensor 8 is digitized by an A/D converter 28 so that it can be analyzed by the CPU 25. The carriage motor 30 is rotatable based on a pulse-step number from a motor driver 32. Further, the controller 24 controls the carriage motor 30 via a motor driver 33, a conveyance motor 31 via a motor driver 32, and a reading motor 52 via a motor driver 53. Also, it inputs output from the carriage home-position sensor 21.

The controller 24 is connected to image-data input devices such as the reading sensor 48, a printer interface 54 for receiving print instruction from an external computer 56 and print data, and a communication line controller 55 for receiving reception data from a telephone line 57. Thus, the controller 24 can be used with a printer for facsimile transmission/reception, a copier, and a printer of the external computer. Further, the controller 24 is connected to an operation panel 58 for a user of the apparatus to perform various operations and instructions. The operation panel 58 has an LCD 59 for displaying messages.

Figure 6:
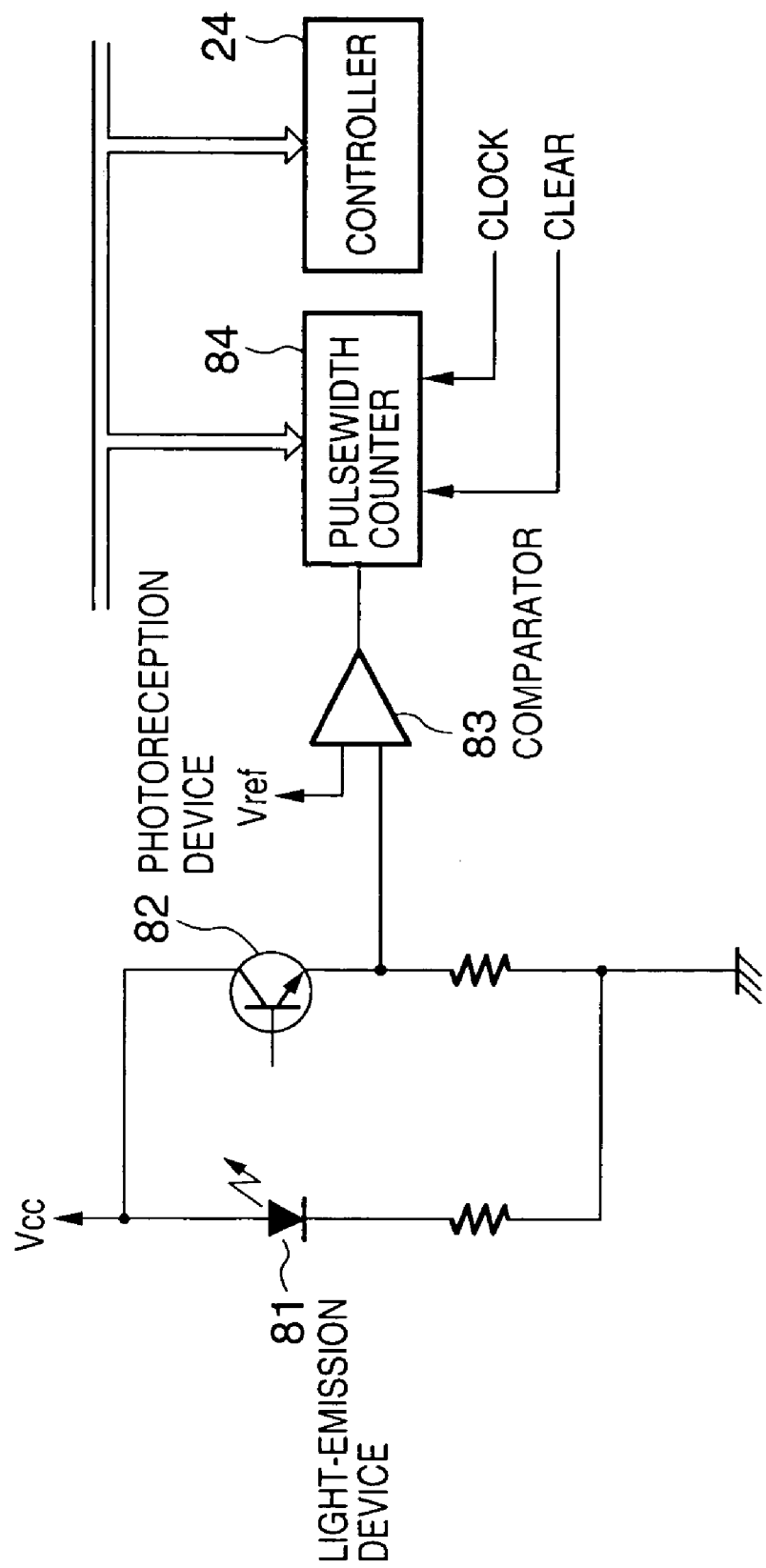
FIG. 6 is a block diagram showing the electrical arrangement of the photosensor 8.

FIG. 6 is a block diagram showing an electrical construction of the photosensor 8.

In FIG. 6, numeral 81 denotes the infrared LED as the light-emission device; 82, the photo-transistor as the photoreception device to receive an infrared light beam from the infrared LED 81; 83, a comparator which inputs output from the photo-transistor 82 and compares it with a predetermined reference voltage(Vref); and 84, a pulsewidth counter which measures a duration (pulsewidth) of ON/OFF status of a pulse outputted from the comparator 83. The pulsewidth counter 84 uses a pulsewidth of an inputted clock(reference clock) as a reference pulsewidth. The pulsewidth counter 84 counts cycles of the reference clock for the duration of ON/OFF status of the pulse outputted from the comparator 83, and outputs a count value to an internal register of the pulsewidth counter 84.

If ink is not discharged from the printhead 5, the infrared light beam from the infrared LED 81 as the light-emission device is not interrupted, the comparator 83 inputs a high (H) level signal from the photo-transistor 82 as the photo-reception device. On the other hand, if ink is discharged from the printhead 5, the discharged ink interrupts the infrared light beam from the infrared LED 81, the output level of the signal from the phototransistor 82 is gradually lowered. When the output level becomes lower than the reference voltage (Vref) inputted into the comparator 83, the output from the comparator 83 to the pulsewidth counter 84 is inverted. Thereafter, when the ink discharge from the printhead 5 has been completed, the output level of the signal from the photo-transistor 8 becomes high (H) again, and when the output level exceeds the reference voltage (Vref) inputted into the comparator 83, the output from the comparator 83 is inverted again.

Thus, the pulsewidth counter 84 inputs a pulse signal of which the pulsewidth corresponds to a duration in which the photosensor 8 detects discharged ink. As described above, the duration of the signal ON/OFF status is measured by using the reference clock, and the count value is stored into the internal register of the pulsewidth counter 84. The count value is read out by the CPU 25 of the controller 24 after the completion of ink discharge, and used for judgment of existence/absence of ink.

Figure 7A:
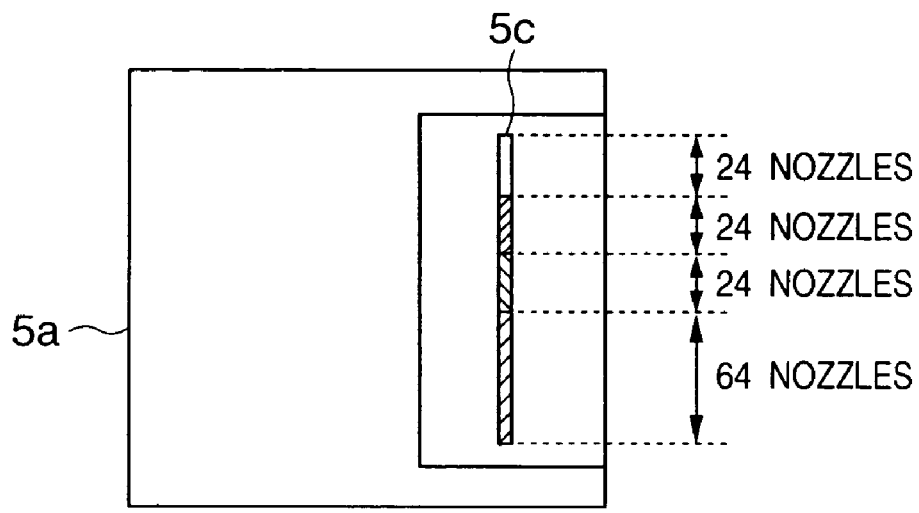
FIGS. 7A and 7B are views showing the nozzle arrangements of a color printhead and monochromatic printhead.
Figure 7B:
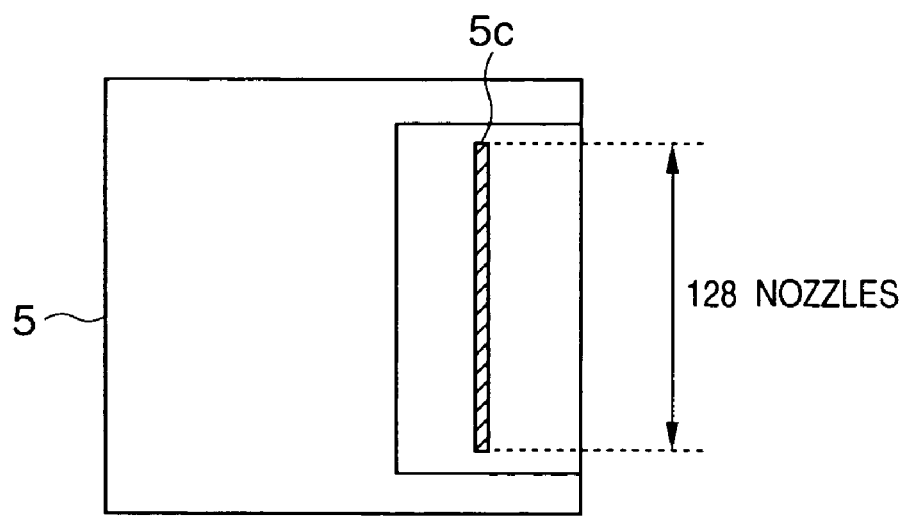

FIGS. 7A and 7B are explanatory views showing a structure of a color printhead and that of a monochrome printhead, used in the facsimile apparatus in FIG. 1. The facsimile apparatus uses the monochrome printhead as shown in FIG. 7B, having an array of 128 nozzles, for printing using only black ink in 360 dpi resolution, or the color printhead as shown in FIG. 7A, having 64 black(K)-ink nozzles, 24 yellow(Y)-ink nozzles, 24 magenta(M)-ink nozzles, and 24 cyan(C)-ink nozzles, for printing in 360 dpi resolution. In this color printhead, the nozzles are also arranged in an array. Since ink colors are pre-determined with respect to respective 24-nozzle groups, the color of ink to be discharged can be selected by selecting nozzles to receive heat pulses. By selecting from the two types of printheads, high-speed monochrome printing or highprecision full-color printing can be performed.

In a facsimile apparatus of this embodiment, these two types of printheads, an ink tank containing a black ink dedicated to monochromatic printing, ink tanks respectively containing yellow (Y), magenta (M), cyan (C), and black (K) inks used for general color printing, and ink tanks containing inks each having a special composition to print a photographic image or the like more sharply are combined so that the following three types of cartridges can be selectively mounted on the carriage and used.

These three types of cartridges are (1) a monochromatic cartridge incorporating a monochromatic printhead and an ink tank containing a black ink, (2) a color cartridge incorporating ink tanks respectively containing yellow, magenta, cyan, and black inks and a color printhead, and (3) a photographic printing color cartridge incorporating ink tanks respectively containing inks each having a special composition for photographic image printing and a color printhead. Each of these cartridges may be a cartridge having a printhead and an ink tank or ink tanks integrated or a cartridge that allows a printhead and an ink tank or ink tanks to be separated from each other, as described above.

The color cartridge uses a set of general C, M, Y, and K inks which can be used for general color printing operation, whereas the photographic printing color cartridge uses a set of photographic printing inks each having a composition to have a density lower than that of general C, M, Y, and K inks. If, therefore, the photographic printing color cartridge (also called a light-color cartridge because of the use of light-colored inks) is used, full-color printing with high precision and good gray-scale expression can be implemented, as compared with printing using general C, M, Y, and K inks, by controlling heat pulses applied to the printhead more finely.

The control unit 24 of this facsimile apparatus detects the specific type of loaded cartridge through a signal line in the flexible cable 19. More specifically, when any one of these cartridges is loaded into the carriage 15, a contact formed on the cartridge is connected to a contact formed in the carriage in a pattern unique to the type of cartridge. The CPU 25 can therefore recognize the type of loaded cartridge in accordance with the connection pattern.

Facsimile reception processing executed by the facsimile apparatus having the above arrangement will be described next.

Figure 8:
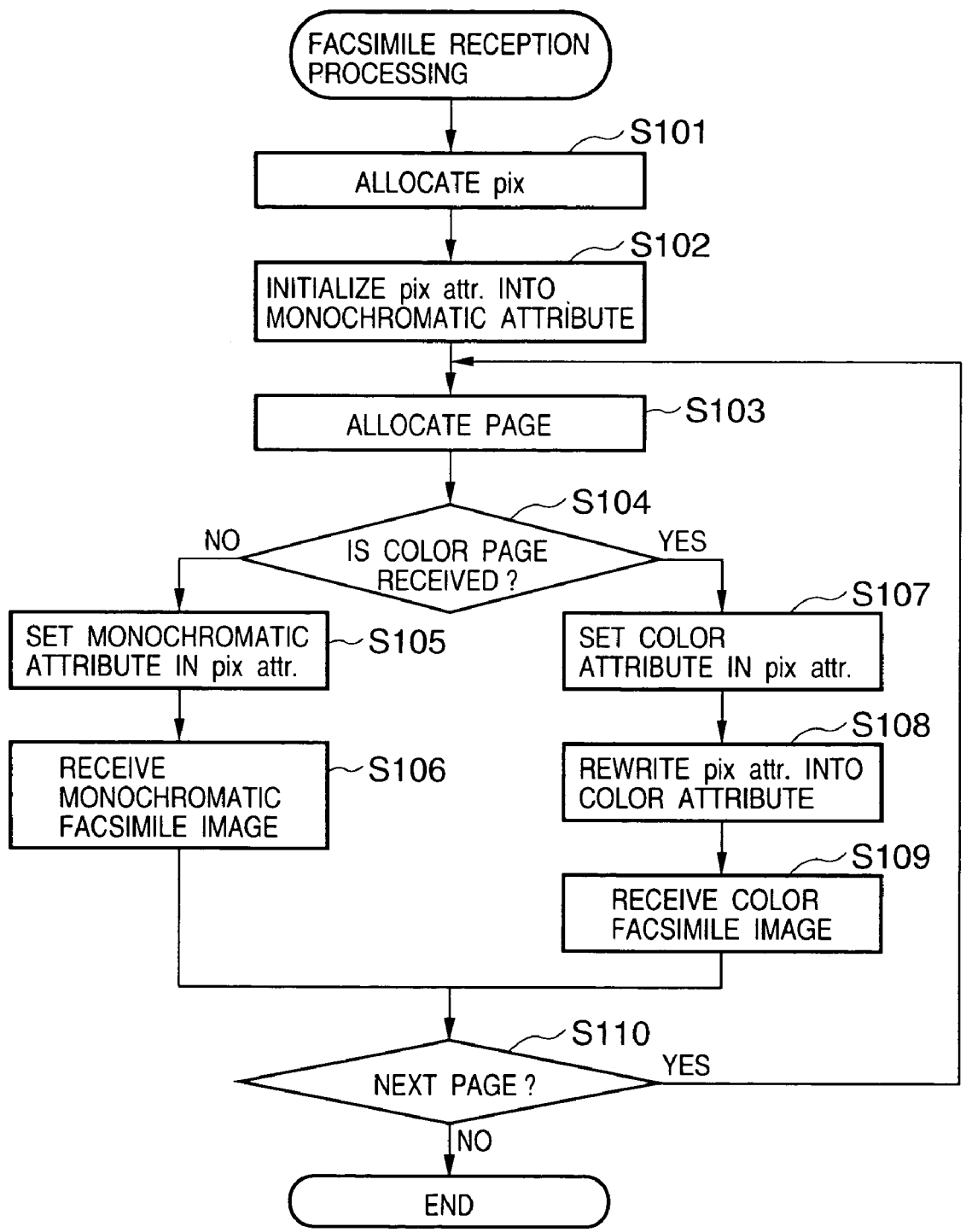
FIG. 8 is a flow chart showing an outline of facsimile reception processing.

FIG. 8 is a flow chart showing an outline of facsimile reception processing. More specifically, FIG. 8 shows a portion for executing processing for management of attributes for discriminating monochromatic facsimile reception from color facsimile reception.

Figure 9:
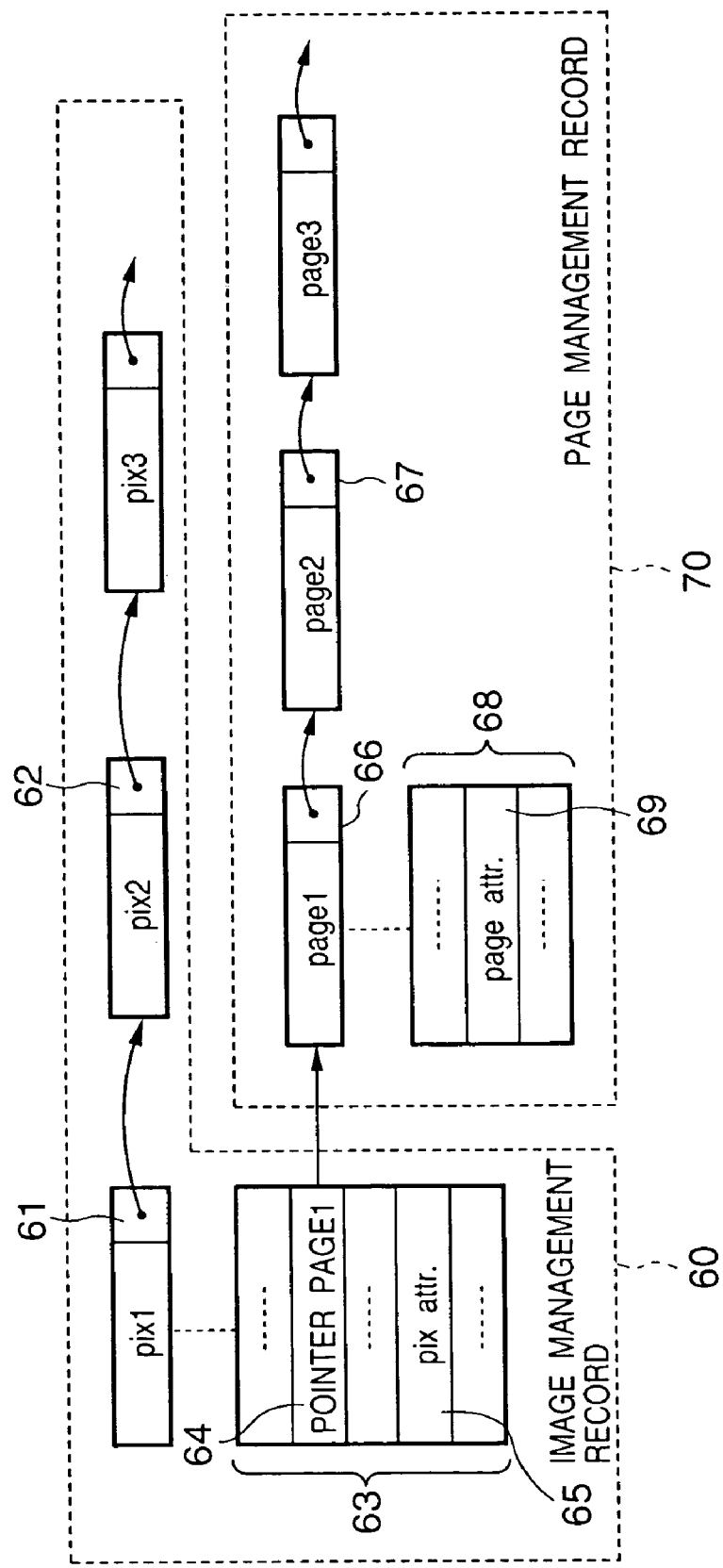
FIG. 9 is a view conceptually showing the format of an image management record.

FIG. 9 is a conceptual illustration of the format of a record (to be referred to as an image management record hereinafter) for managing each image and the format of a record (to be referred to as a page management record hereinafter) for managing pages making up each image in the facsimile apparatus of the present invention. These management records are retained in the RAM 27.

As shown in FIG. 9, each image management record (60) is made up of a plurality of fields (63), which include a page management record pointer field (64), in which the start address of a page management record subordinate to each image management record is stored, and a pix atrr. field, in which an attribute of the page managed by the image management record is recorded.

Each page management record (70) having a list structure including the page management record pointer field (64) of an image management record as a head portion is made up of a plurality of fields (68), which include a page atrr. field (69) in which an attribute value indicating whether the corresponding page is a monochromatic or color page is stored.

Facsimile reception processing will be described below with reference to FIGS. 8 and 9.

When facsimile reception is started, the facsimile reception processing shown in FIG. 8 is executed.

In step S101, one area for an image management record (pix m) in FIG. 9 is ensured and added to the image management record having the list structure. More specifically, when the second record (pix 2) is to be added while the area for the first record (pix 1) is ensured, the area for the second record is ensured first, and then the start address of pix 2 is written in the pointer area (61) of the preceding record (pix 1). When the third record (pix 3) is to be added as well, its area is ensured first, and then the start address of pix 3 is written in the pointer area (62) of pix 2. Subsequently, new image management records are added in the same manner.

In step S102, the pix attr. field of pix m, whose area has been ensured in step S101, is initialized to an attribute value indicating that the corresponding image is a facsimile-received image constituted by only monochromatic pages.

In step S103, an area for a page management record (page n) in FIG. 9 is ensured. A page management record is added by the same method as that for an image management record. That is, the start address of an ensured area is written in the pointer area of the preceding page. More specifically, if that page management record is the first page of pix m, its pointer is set in the pointer field of page 1 of pix m ensured in step S101. If the second page (page 2) is added, its start address is stored in the pointer area (66) of the first page (page 1). If the third page (page 3) is added, its start address is stored in the pointer area (67) of page 2.

In step S104, it is checked whether the page which is to be received is a monochromatic or color page. If the page is a monochromatic page, the flow advances to step S105. If the page is a color page, the flow advances to step S107.

In step S105, an attribute value indicating a monochromatic page is set in the page attr. field of page n whose area has been ensured in step S103.

In step S106, facsimile reception of the monochromatic page is performed. The flow then advances to step S110.

In step S107, an attribute value indicating a color page is set in the page attr. field of page n whose area has been ensured in step S103.

In step S108, the pix attr. field of pix m whose area has been ensured in step S101 is rewritten into an attribute value indicating that the received image is a facsimile-received image including at least one color page.

In step S109, facsimile reception of a color page is performed. The flow then advances to step S110.

In step S110, it is checked whether there is the next page in a facsimile transmission procedure. If YES in step S110, the flow returns to step S103. If NO in step S110, the facsimile reception processing is terminated.

Processing of automatically printing a facsimile-received image will be described next with reference to the flow chart of FIG. 10.

In step S201, it is checked whether any facsimile-received image is present in the image management record list in FIG. 9. If YES in step S201, the list is selected, and the flow advances to step S202. If NO in step S201, it is repeated.

In step S202, it is checked whether a management record for the start page whose page is defined is present in the image management record list selected in step S201. If YES in step S202, the flow advances to step S203. If NO in step S202, the flow returns to step S201.

In step S203, it is checked whether an attribute value indicating that the received image is a facsimile-received image including at least one color page is set in the attribute field (pix attr.) of the image management record list selected in the step S201. If the attribute value indicates that the received image is constituted by only monochromatic pages, the flow advance to step S204. If the attribute value indicates that the received image is a facsimile-received image including at least one color page, the flow advances to step S212.

In step S204, it is checked through the flexible cable 19 whether the loaded cartridge is a monochromatic cartridge dedicated to monochromatic printing, a color cartridge capable of color printing, or a light-color cartridge. If it is determined that the loaded cartridge is a monochromatic cartridge dedicated to monochromatic printing, the flow advances to step S211. If the loaded cartridge is capable of color printing, the flow advances to step S205.

In step S205, it is checked whether the loaded cartridge is a color cartridge for general color printing operation or a light-color cartridge for photographic printing. If it is determined that a general color cartridge is loaded, the flow advances to step S206. If it is determined that a light-color cartridge, which is more expensive than a general color cartridge, is loaded, the flow advances to step S210.

In step S210, an attribute value indicating that the received image is an image received by memory alternate reception is set in the field (pix attr.) of the image management record in FIG. 9. With this operation, the list selected in step S201 is excluded from automatic printing targets, thereby preventing expensive inks from being used to print a facsimile image that is only required to have a resolution lower than that of a general printer image. Thereafter, the flow returns to step S201.

In step S206, it is checked whether the lack of black (K) ink has been detected in automatic printing of the facsimile-received image immediately before this processing. If NO in step S206, the flow advances to step S207 to print each page corresponding to the list selected in step S201 in the automatic printing mode. This printing processing is described in detail later. If YES in step S206, it is determined that printing cannot be performed, and the flow advances to step S210 to execute memory alternate reception.

In step S208, it is checked whether printing of each page corresponding to the selected list in step S207 is normally completed. If YES in step S208, the flow advances to step S109 to delete the list corresponding to the facsimile-received image having undergone normal printing from the image management record in FIG. 9, thus releasing the corresponding storage area. Thereafter, the flow returns to step S201. In contrast to this, if NO in step S208, the flow advances to step S210 to execute memory alternate reception.

In step S211, it is checked whether the lack of black (K) ink has been detected in automatic printing of the facsimile-received image immediately before this processing. If NO in step S211, the flow advances to step S207. If YES in step S211, it is determined that printing cannot be performed, and the flow advances to step S210 to execute memory alternate reception.

If it is determined that the received image includes at least one color page, and the flow advances to step S212, it is checked through the flexible cable 19 whether the loaded cartridge is a monochromatic cartridge dedicated to monochromatic printing. If it is determined that the cartridge is a monochromatic cartridge, since the color facsimile-received image cannot be printed, the flow advances to step S210.

If it is determined that a cartridge capable of color printing is loaded, the flow advances to step S213 to check whether the loaded cartridge is a color cartridge for general color printing or a light-color cartridge. If it is determined that a general color cartridge is loaded, the flow advances to step S214. If it is determined that a light-color cartridge which is more expensive than a general color cartridge is loaded, the flow advances to step S210 to exclude the selected list from automatic printing targets and execute memory alternate reception. This prevents the use of expensive ink.

It is checked in step S214 whether the lack of any of cyan (C), magenta (M), and yellow (Y) inks has been detected in automatic printing of the color facsimile-received image immediately before this processing. If it is determined that all the C, M, and Y inks are left, the flow advances to step S215. If it is determined that any of the C, M, and Y inks has run out, it is determined that printing cannot be performed. The flow then advances to step S210 to execute memory alternate reception.

It is checked in step S215 whether the lack of black (K) ink has been detected in automatic printing of the facsimile-received image immediately before this processing. If NO in step S215, the flow advances to step S207. If YES in step S215, the flow advances to step S210.

In step S216, it is checked whether the user has permitted process black printing in which black is developed by using C, M, and Y inks instead of black (K) ink. If YES in step S216, the flow advances to step S207. If NO in step S216, it is determined that printing cannot be performed, and the flow advances to step S210 to execute memory alternate reception.

Figure 11:
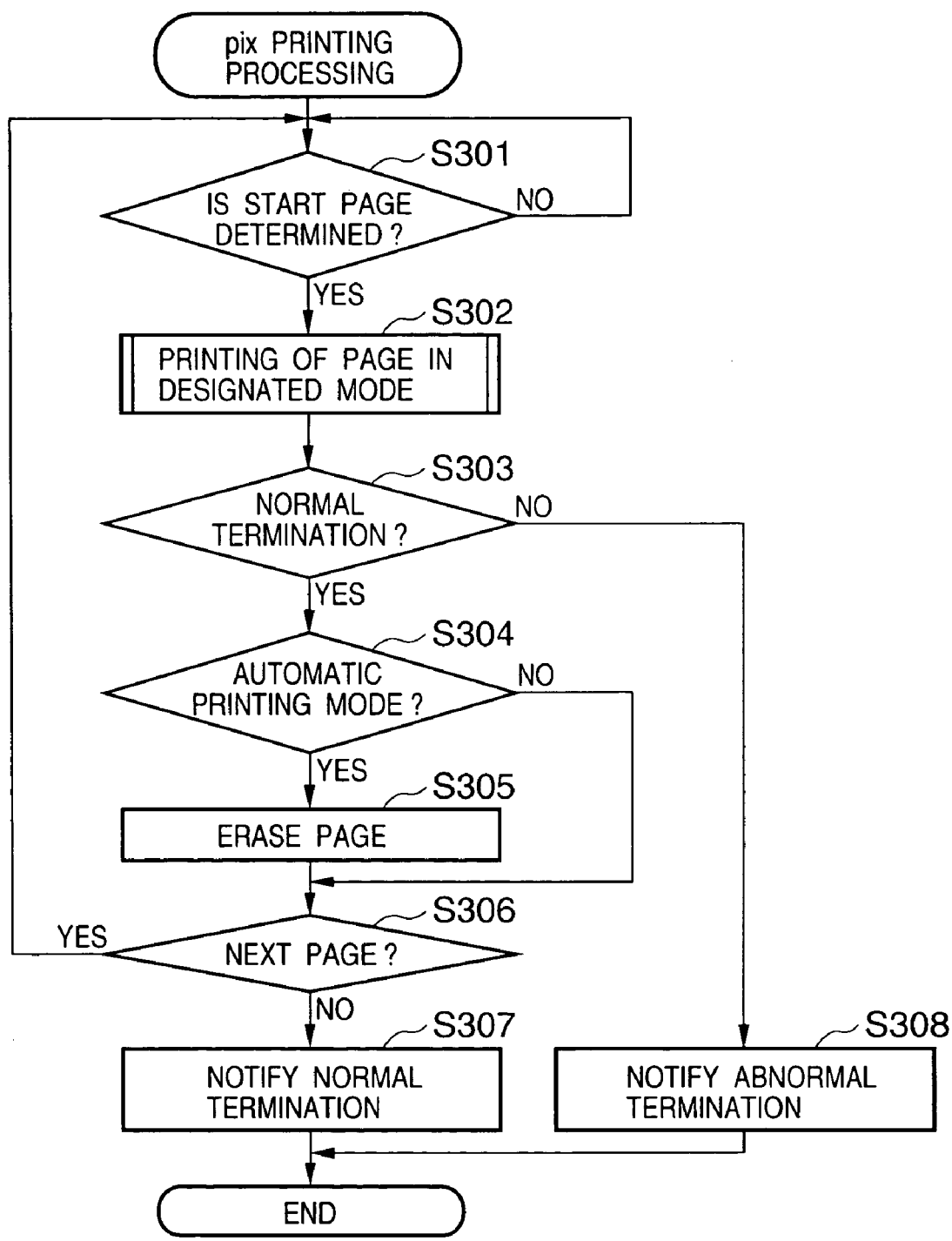
FIG. 11 is a flow chart showing the details of printing processing.

The details of the printing processing in step S207 will be described next with reference to the flow chart of FIG. 11.

In step S301, the flow waits until the start page of the list selected in step S201 is determined. If this page is determined, the page is selected. The flow then advances to step S302 to print the selected page in a designated mode. Note that the details of page printing processing will be described later.

In step S303, it is checked whether printing of the page in step S302 is normally completed. If YES in step S303, the flow advances to step S304. If NO in step S303, the flow advances to step S308.

In step S304, it is checked whether printing processing on a reception basis corresponding to the selected list is started in the automatic printing mode. If YES in step S304, the flow advances to step S305 to delete a page management record corresponding to a page having undergone normal printing from the image management record in FIG. 6, thereby releasing the corresponding area. The flow then advances to step S306. If NO in step S304, the flow advances to step S306.

In step S306, it is checked whether the next page is present in the received image corresponding to the list selected in step S201. If YES in step S306, the flow returns to step S301. If NO in step S306, the flow advances to step S307.

In step S307, information indicating normal termination is notified (more specifically, step S208 is notified of the information), thus terminating the printing processing. In step S308, information indicating abnormal termination is notified (more specifically, the step S208 is notified of the information), thus terminating the printing processing.

Figure 12:
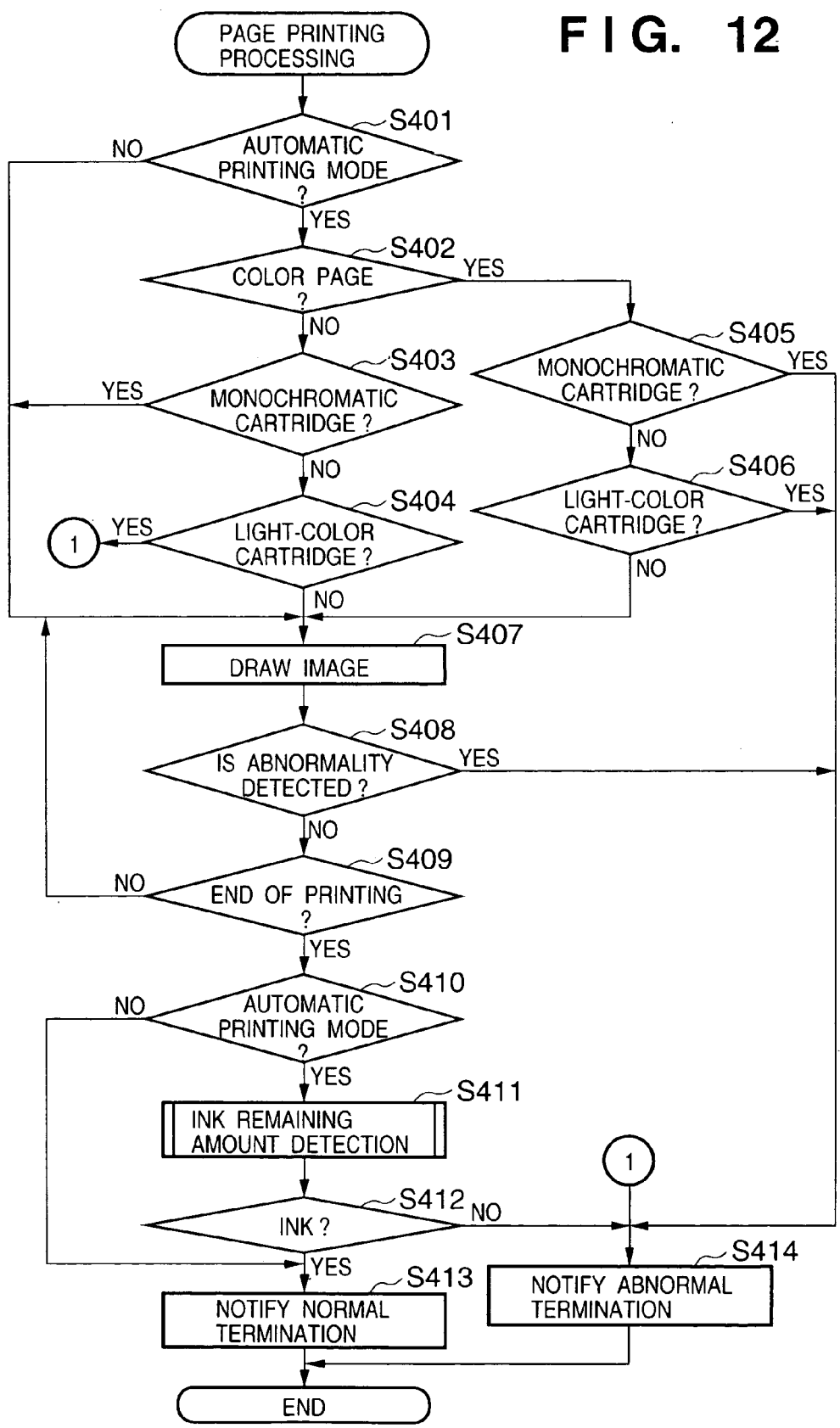
FIG. 12 is a flow chart showing the details of page printing processing.

The page printing processing in step S302 will be described in detail next with reference to the flow chart of FIG. 12.

In step S401, it is checked whether page printing processing is started in the automatic printing mode. If YES in step S401, the flow advances to step S402. If NO in step S401, it is determined that the user has permitted printing a color image in monochrome or outputting an image with higher precision by using expensive inks, and the flow advances to step S407.

In step S402, it is checked whether an attribute value indicating a color page is set in the field (page attr.) of a page management record of the list selected in step S301. If the attribute value indicates a monochromatic page, the flow advances to step S403. If the attribute value indicates a color page, the flow advances to step S405.

In step S403, it is checked through the flexible cable 19 whether the loaded cartridge is a monochromatic cartridge. If the cartridge is a monochromatic cartridge, the flow advances to step S407. If the cartridge is of another type, the flow advances to step S404.

In step S404, it is checked whether the loaded cartridge is a general color cartridge or a light-color cartridge. If the cartridge is a general color cartridge, the flow advances to step S407. If it is determined that a light-color cartridge more expensive than a general color cartridge is loaded, the flow advances to step S414 to exclude the facsimile image corresponding to the list selected in step S301 from automatic printing targets. This prevents expensive inks from being used to print a facsimile image that is only required to have a resolution lower than that of a general printer image. Information indicating that the image cannot be normally printed is notified. This notification is discriminated in step S303.

In step S405, it is checked through the flexible cable 19 whether the loaded cartridge is a monochromatic cartridge. If YES in step S405, since no color page image can recorded, the flow advances to step S414. If the loaded cartridge is a cartridge capable of color printing, the flow advances to step S406.

In step S406, it is checked whether the loaded cartridge is a general color cartridge or light-color cartridge. If it is determined that a general color cartridge is loaded, the flow advances to step S407. If it is determined that a light-color cartridge more expensive than a general color cartridge is loaded, the flow advances to step S414 to exclude the facsimile image corresponding to the list selected in step S301 from automatic printing targets. This prevents expensive inks from being used to print a facsimile image that is only required to have a resolution lower than that of a general printer image. Information indicating that the image cannot be normally printed is notified. This notification is discriminated in step S303.

In step S407, facsimile image information on a printing page is decoded in units of lines or specific blocks, and image printing processing is performed. In step S408, it is checked whether any error has occurred in the printing system during execution of this printing processing. If YES in step S408, the flow advances to step S414. If NO in step S408, the flow advances to step S409. In step S409, it is checked whether a one-page image is completely printed. If NO in step S409, the flow returns to step S407 to continue the printing processing. If YES in step S409, the flow advances to step S410.

In step S410, it is checked again whether page printing processing is started in the automatic printing mode. If YES in step S410, the flow advances to step S411 to execute ink remaining amount detection processing. If NO in step S410, the flow skips this processing and advances to step S413.

In step S411, ink remaining amount detection processing is performed depending on whether the printed page is a monochromatic or color page. This processing will be described in detail later.

In step S412, it is checked whether the presence of ink is determined by ink remaining amount detection processing. If YES in step S412, the flow advances to step S413. If it is determined that no ink is left, the flow advance to step S414.

In step S413, information indicating normal termination is notified (more specifically, step S303 is notified of the information), and the page printing processing is terminated.

In step S414, information indicating abnormal termination is notified (more specifically, step S303 is notified of the information), and the page printing processing is terminated.

Figure 13:
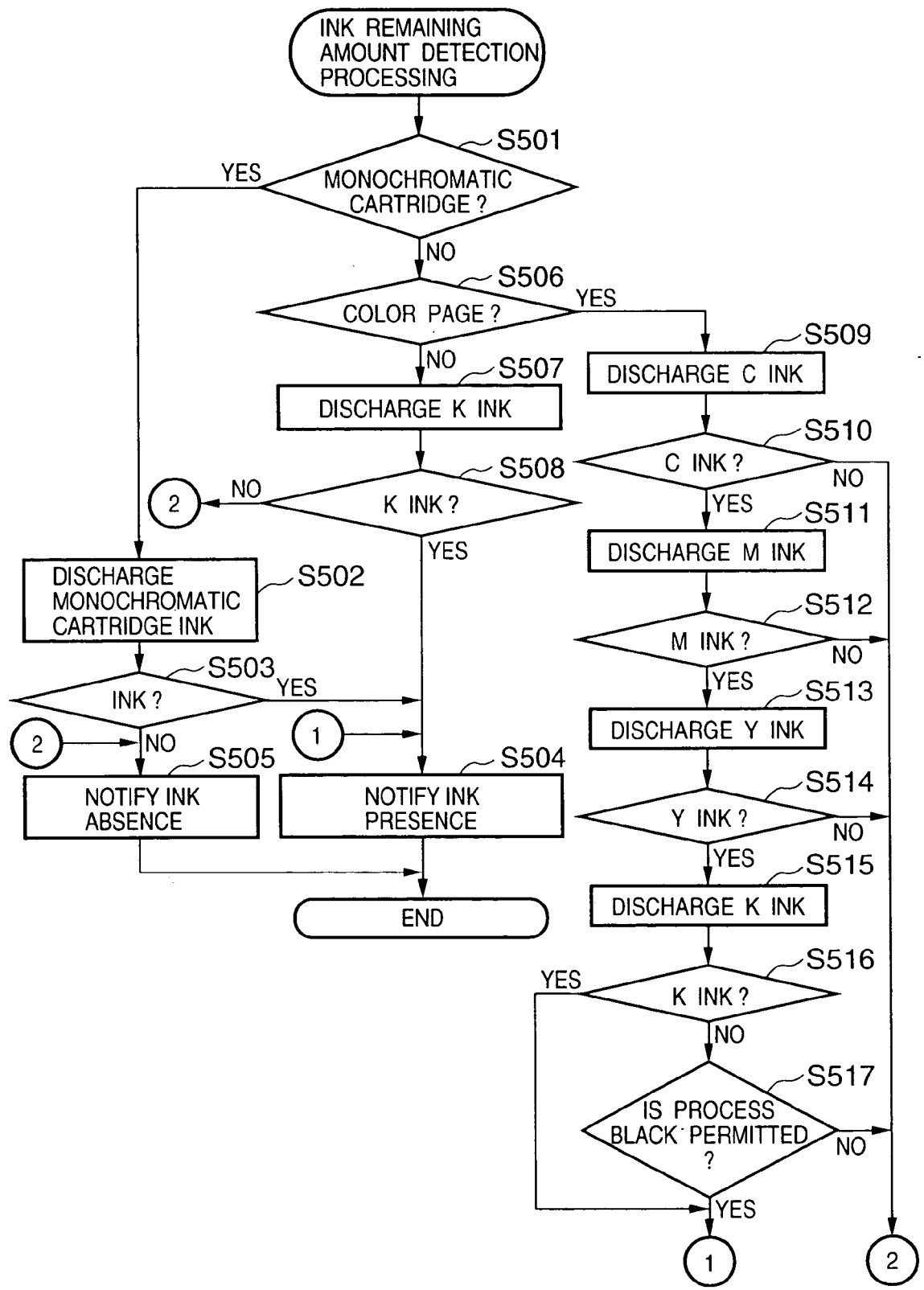
FIG. 13 is a flow chart showing the details of ink remaining amount detection processing.

The ink remaining amount detection processing in step S411 will be described in detail next with reference to the flow chart of FIG. 13.

In step S501, it is checked through the flexible cable 19 whether the loaded cartridge is a monochromatic cartridge or a cartridge capable of color printing (a color cartridge or light-color cartridge). If the cartridge is a monochromatic cartridge, the flow advances to step S502. If the cartridge is a cartridge capable of color printing, the flow advances to step S506.

In step S502, the printhead (see FIG. 7B) incorporated in the monochromatic cartridge is moved to the position of the photosensor 8, the infrared LED 81 is made to emit light, and black (K) ink is discharged, thereby detecting the remaining amount of black (K) ink. In this discharging operation, ink is discharged to cross the optical axis extending from the light-emission device to the photoreception device of the photosensor 8.

In step S503, the presence/absence of black (K) ink is determined on the basis of the count value of the pulsewidth counter 84 after the discharge processing in step S502. If it is determined that black (K) ink is left, the flow advances to step S504. If it is determined that no black (K) ink is left, the flow advances to step S505.

In step S504, information indicating the presence of ink is notified (step S412 is notified of the information). In step S505, information indicating the absence of ink is notified (step S412 is notified of the information). Thereafter, the ink remaining amount detection processing is terminated.

In step S506, it is checked whether the page subjected to page printing processing is a monochromatic or color page. If it is determined that the page is a monochromatic page, the flow advances to step S507. If it is determined that the page is a color page, the flow advances to step S509.

In step S507, the printhead (see FIG. 7A) incorporated in the cartridge capable of color printing (the color cartridge or light-color cartridge) is moved to the position of the photosensor 8, the infrared LED 81 is made to emit light, and a heat pulse is supplied to only a nozzle for discharging black (K) ink to perform ink discharging operation, thereby detecting the remaining amount of black (K) ink.

In step S508, it is checked on the basis of the count value of the pulsewidth counter 84 whether black (K) ink is left after the discharging processing in step S507. If YES in step S508, the flow advances to step S504. If NO in step S508, the flow advances to step S505.

In step S509, the printhead (see FIG. 7A) incorporated in the cartridge capable of color printing (the color cartridge or light-color cartridge) is moved to the position of the photosensor 8, the infrared LED 81 is made to emit light, and a heat pulse is supplied to only a nozzle corresponding to cyan (C) ink to perform ink discharging operation, thereby detecting the remaining amount of cyan (C) ink.

In step S510, it is checked on the basis of the count value of the pulsewidth counter 84 whether cyan (C) ink is left after the discharging operation in step S509. If YES in step S510, the flow advances to step S511. If NO in step S510, the flow advances to step S505.

In step S511, the remaining amount of magenta (M) ink is detected in the same manner as in step S509. In step S512, the presence/absence of magenta (M) ink is determined after the discharging operation in step S511 in the same manner as in step S510. If it is determined that magenta (M) ink is left, the flow advances to step S513. If it is determined that no magenta (M) ink is left, the flow advances to step S505.

In step S513, the remaining amount of yellow (Y) ink is detected in the same manner as in step S509. In step S514, the presence/absence of yellow (Y) ink is determined after the discharging operation in step S513 in the same manner as in step S510. If it is determined that yellow (Y) ink is left, the flow advances to step S515. If no yellow (Y) ink is left, the flow advances to step S505.

In step S515, the remaining amount of black (K) ink is detected in the same manner as in step S507. In step S516, the presence/absence of black (K) ink is determined after the discharging operation in step S515 in the same manner as in step S508. If it is determined that black (K) ink is left, the flow advances to step S504. If no black (K) ink is left, the flow advances to step S517.

In step S517, it is checked whether the user has permitted process black printing in which black is expressed by using C, M, and Y inks instead of a black (K) ink. If YES in step S517, the flow advances to step S504. Otherwise, it is determined that printing cannot be performed, and the flow advances to step S505.

Figure 14:
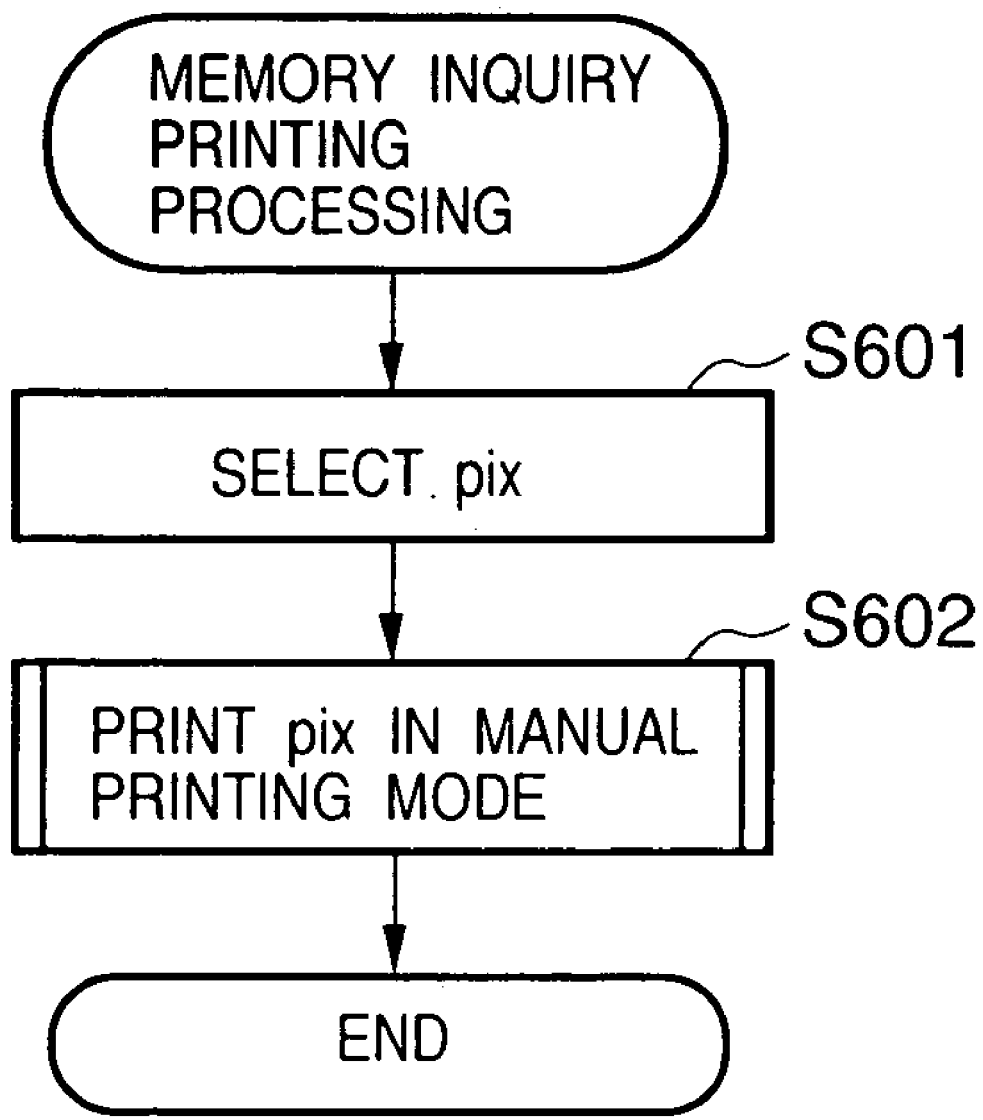
FIG. 14 is a flow chart showing memory inquiry printing processing.

Memory inquiry printing processing in which the user manually selects an image stored in the memory and prints it will be described last with reference to the flow chart of FIG. 14.

In step S601, the user operates the operation panel 58 to select one of a plurality of images stored in the memory. In step S602, the printing processing shown in the flow chart of FIG. 11 is executed to print each page of the image selected in step S601 in the manual printing mode.

When the manual mode is designated in this manner, the flow skips the page erase processing in step S305, the printing suppression processing based on a combination of the type of page (color image page or monochromatic image page) and the type of cartridge in steps S402 to S406, and the ink remaining amount detection processing in steps S411 to S412. That is, any page having undergone printing is not erased, and a color image can be converted into a monochromatic image and printed or a color facsimile image with higher precision can be printed by using an expensive light-color cartridge in accordance with an instruction from the user. In addition, the consumption of ink can be suppressed by suppressing unnecessary ink remaining amount detection processing with respect to an image that is not erased.

According to the embodiment described above, therefore, in printing a received facsimile image, the type of loaded cartridge and type of received facsimile image are discriminated, and an image is automatically printed or is stored in the memory to be printed in response to a manual printing instruction in accordance with the discrimination result. This prevents expensive ink to be unintentionally used to print a low-resolution facsimile image.

Furthermore, in printing a received facsimile image, if a cartridge capable of color printing is loaded, execution of ink remaining amount detection processing is controlled in accordance with the type of printed image. If, for example, a monochromatic image is printed, the remaining amount of black ink is detected. Only if a color image is printed, the remaining amounts of all inks are detected. This suppresses unnecessary ink consumption for ink remaining amount detection processing.

This makes it possible to reduce the running cost associated with ink consumption.

First Embodiment

Figure 15:
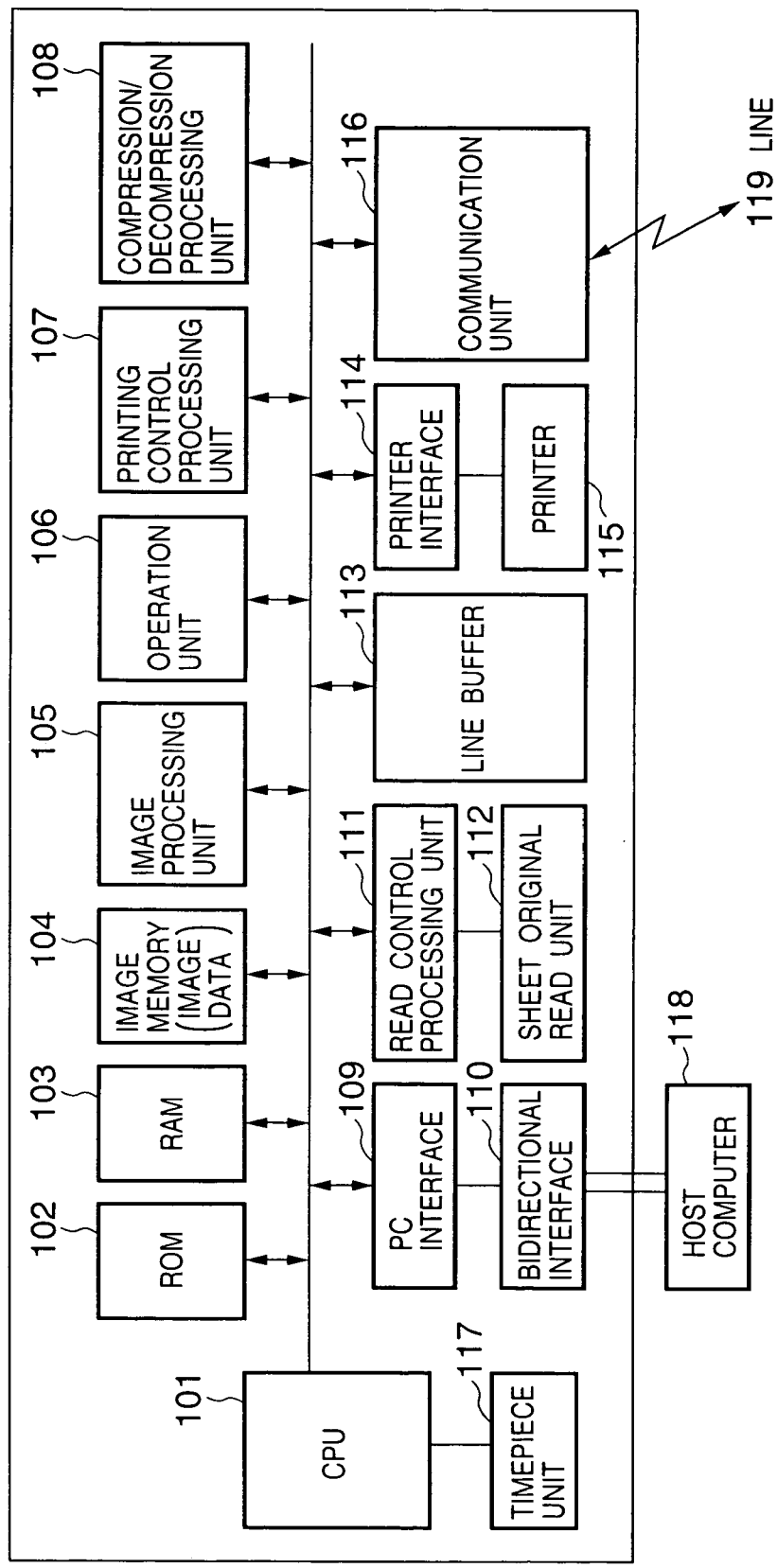
FIG. 15 is a block diagram showing the arrangement of a facsimile apparatus according to an embodiment of the present invention.

FIG. 15 is a block diagram showing the arrangement of a facsimile apparatus as a communication apparatus using the image forming apparatus according to the present invention.

A CPU 101 is a system control unit for controlling the overall apparatus. A ROM 102 is used to store control programs for the CPU 101. A RAM 103 is formed by an SRAM or the like and used to store program control variables and the like. In addition, set values registered by an operator, management data or the like for the apparatus, and various work buffers are stored in the RAM 103. An image memory 104 is formed by a DRAM or the like and used to store image data. An image processing unit 105 performs edge emphasis, luminance/density conversion, multilevel/binary conversion, and the like.

An operation unit 106 is made up of a keyboard and the like and used by the operator to perform various input operations. A printing control processing unit 107 converts binary information into a native command for printing. A compression/decompression unit 108 converts image data such as MH and MR data. A PC interface unit 109 controls a bidirectional interface unit 110 to control transmission/reception of information to/from an external host computer 118.

A sheet scanner 112 is comprised of a CS or CCD image sensor, original convey mechanism, and the like, and serves to optically read an original and convert it into electrical image data. This image data is subjected to gamma processing and position correction processing in a read control processing unit 111 to output high-precision image data.

A line buffer 113 is a buffer used to perform transfer control of image data. A printer 115 is a BJ (Bubble-Jet) printer for printing a received image or file data on plain paper. A printer interface unit 114 converts file data from a personal computer into a printer description language when it is printed.

A communication unit 116 is comprised of a modem for communicating with another communication apparatus through a line 119, a network control unit, and the like. A timepiece unit 117 measures operation intervals and the like, and is formed by a clock IC and the like.

Figure 16:
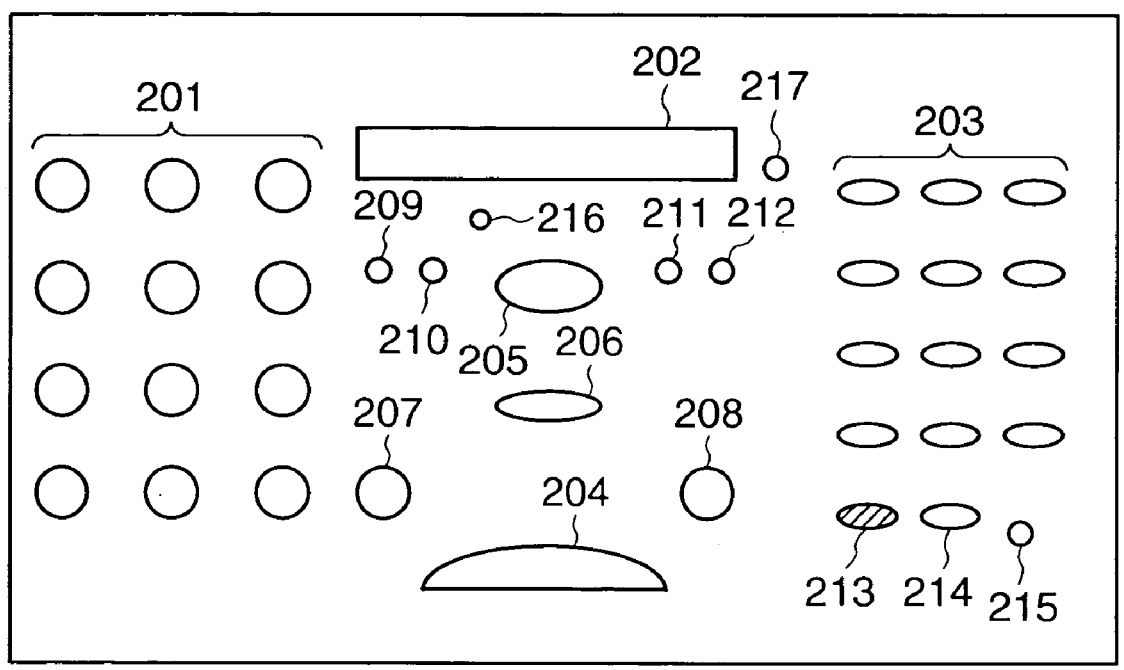
FIG. 16 is a view showing the outer appearance of the operation unit of the facsimile apparatus.

FIG. 16 is a view showing the outer appearance of the operation unit (106) in FIG. 15.

The operation unit 106 includes 1) a ten-key pad 201 for originating a telephone call; 2) a one-touch key 203; 3) a display unit 202 for prompting the operator to perform various operations and displaying error (warning) information; 4) a start key 204 for starting operation such as copying, communication, or scanning; 5) a switching key 205 for switching color processing and monochromatic processing; 6) a resolution key 206 for setting a resolution in copying operation, communication, or the like; 7) an on-hook key 207 that is used to capture a line; 8) a stop key 208 for stopping various operations; 9) a redialing key 209 for redialing a telephone number dialed in immediately preceding originating operation; 10) an abbreviated key 210 that is used to originate a call by using a code in which a telephone number is registered in advance; 11) a reception mode switching key 211 for switching reception modes such as automatic reception, manual reception, and F/T switching; 12) a copy key 212 for given an instruction to perform copying operation; 13) function mode keys for giving instructions to perform various registering operations and test operations; 14) a display lamp 213 formed by an LED element; 15) a set key 214 for determining information in various registering operations; 16) an error cancel key 215 for canceling operation when an error associated with the printer occurs; 17) a color operation display lamp 216 for displaying information indicating selection of the color printing mode or monochromatic printing mode; 18) and an alarm lamp 217 for notifying an abnormal state of the main body.

Figure 17:
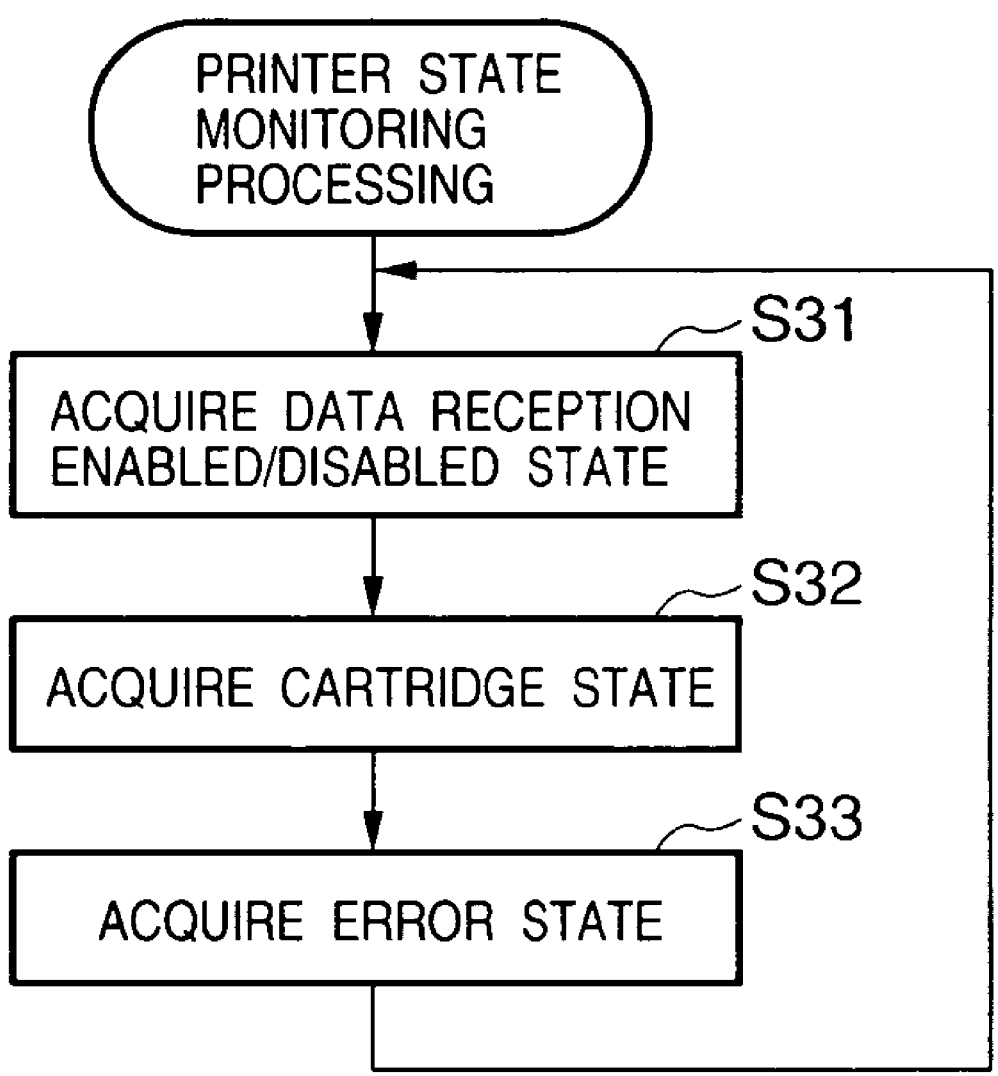
FIG. 17 is a flow chart showing processing of monitoring the state of the printer.

FIG. 17 is a flow chart showing printer state monitoring processing.

Each printer state monitoring process is periodically executed at predetermined time intervals.

In step S31, states associated with information indicating whether data can be received or not, which are held in the printer (115), are acquired through the printer interface (114). The states associated with information indicating whether data can be received or not include a driving power supply state, line state, operation state, the presence/absence of an error. In this step, the respective acquired contents are stored in areas prepared in the RAM (103) to store the respective states. The areas for storing the states will be described later.

In step S32, information associated with the cartridge loaded into the printer (115) is acquired through the printer interface (114) in FIG. 15 in the same manner as in step S31. The information associated with the cartridge includes the presence/absence of a cartridge, the type of cartridge, and a light-color cartridge attribute. In this step, the respective acquired contents are stored in areas prepared in the RAM (103) to store the respective states.

In step S33, states associated with errors in the printer are acquired in the same manner as in the above step. The states associated with errors include a paper jam, paper feed error, and carriage error. The respective acquired contents are stored in areas prepared in the RAM (103) to store the respective states, and step S31 is repeated.

Figure 18:
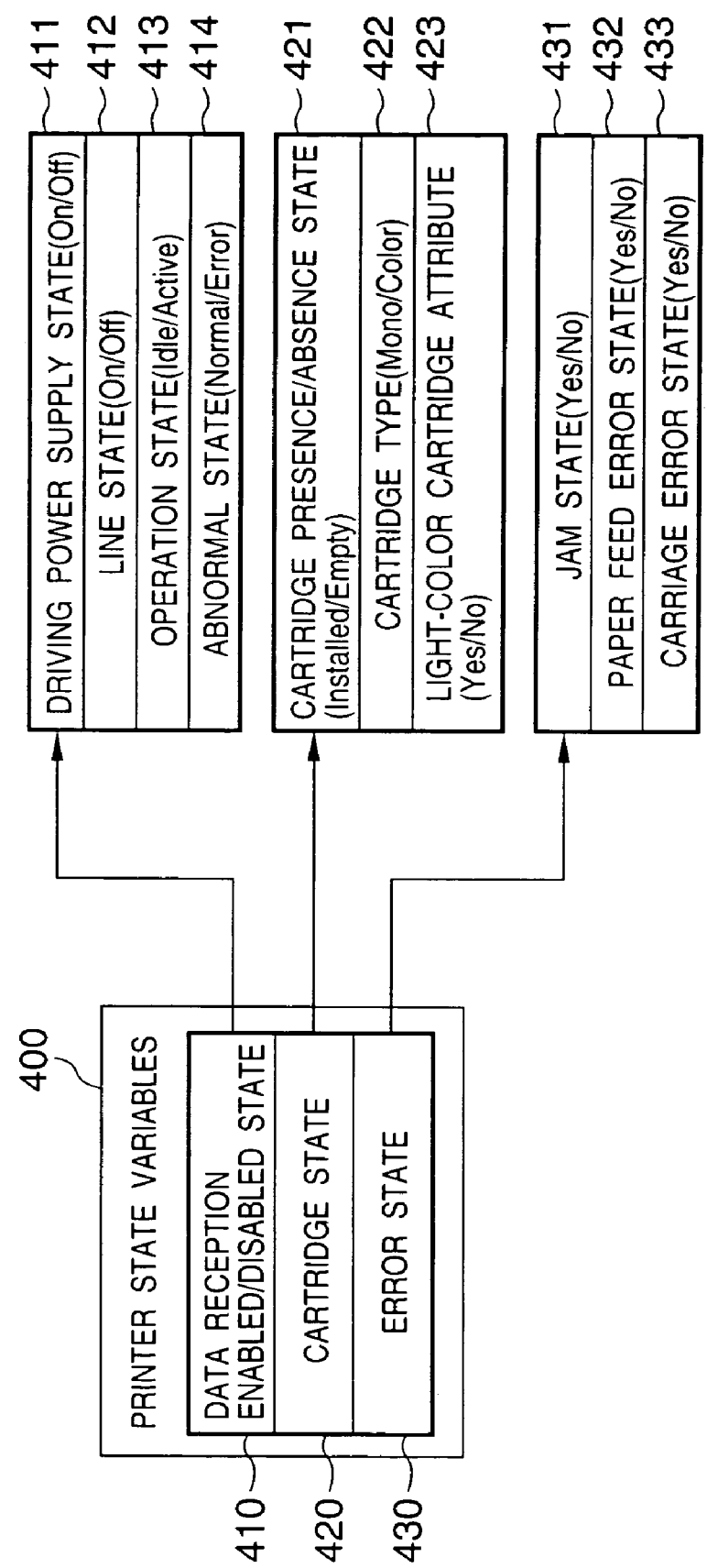
FIG. 18 is a view showing a RAM area in which the contents acquired by the printer state monitoring processing in FIG. 17 are stored.

FIG. 18 is a view showing the areas in the RAM (103) in which the contents acquired in the printer state monitoring processing in FIG. 17 are stored.

Printer state variables (400) are set in the RAM (103) in FIG. 15.

The printer state variables (400) are made up of a data reception enabled/disabled state storage area (410), cartridge state storage area (420), and error state storage area (430).

The data reception enabled/disabled state storage area (410) is constituted by a driving power supply state storage area (411), line state storage area (412), operation state storage area (413), and abnormal state storage area (414). The cartridge state storage area (420) is constituted by a cartridge presence/absence state storage area (421), cartridge-type storage area (422), and light-color cartridge attribute storage area (423). The error state storage area (430) is constituted by a paper jam state storage area (431), paper feed error state storage area (432), and carriage error state storage area (433).

In the driving power supply state storage area (411), a value indicating whether power for driving the printer is supplied (On) or not (Off) is stored. Note that even while no driving power is supplied to the printer (115), power large enough to respond to requests to acquire the various states described above is supplied to the printer.

In the line state storage area (412), a value indicating whether an online state in which the printer can receive data is set (On) or not (Off) is stored.

In the operation state storage area (413), a value indicting whether the printer is operating (Active) or not (Idle) is stored.

In the abnormal state storage area (414), a value indicating whether the printer is in a state (Normal) in which printing can be normally performed or a state (Error) in which printing cannot be performed due to an error is stored.

In the cartridge presence/absence state storage area (421), a value indicating whether a cartridge is loaded (Installed) into the printer or not (Empty) is stored.

In the cartridge-type storage area (422), a value indicating whether the loaded cartridge is monochromatic cartridge (Mono) or color cartridge (Color) is stored. Note that this area is effective only when a cartridge is loaded into the printer.

In the light-color cartridge attribute storage area (423), a value indicating whether a light-color cartridge, which is more expensive than a general color cartridge and is suited to printing a photographic image or the like more sharply, is loaded (Yes) or not (No) is stored. Note that this area is effective only when a color cartridge is loaded into the printer.

In the jam state storage area (431), a value indicating whether a paper jam has occurred (Yes) or not (No) is stored.

In the paper feed error state storage area (432), a value indicating whether an error has occurred in paper feed operation (Yes) or not (No) is stored.

In the carriage error state storage area (433), a value indicating whether, for example, the collision of a cartridge with some obstacle during printing has disabled predetermined printing operation (Yes) or not (No) is stored.

Figure 19:
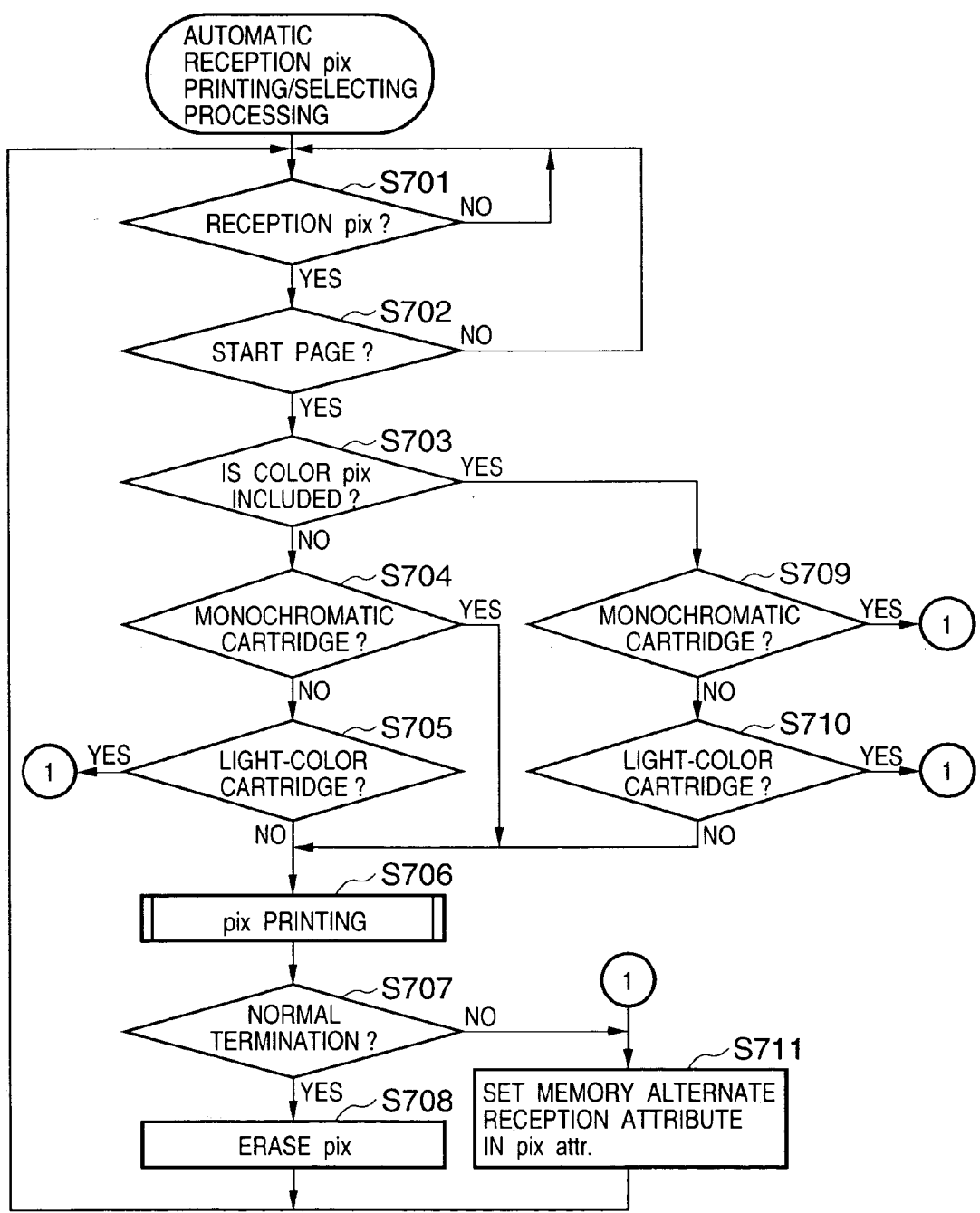
FIG. 19 is a flow chart showing processing of selecting one of a plurality of facsimile-received images and automatically outputting the image.

FIG. 19 is a flow chart showing processing of selecting one of a plurality of facsimile-received images and automatically printing the image. Since reception processing in the facsimile apparatus of this embodiment may be performed in the same manner as described in the first embodiment with reference to FIGS. 8 and 9, a description thereof will be omitted.

In step S701, it is checked whether a facsimile-received image is present in the image management record list shown in FIG. 9. If YES in step S701, the image is selected, and the flow advances to step S702. If NO in step S701, step S701 is repeated at predetermined time intervals.

In step S702, it is checked whether a management record for the start page of a determined page is present in the image management record selected in step S701. If YES in step S702, the flow advances to step S703. If NO in step S702, the flow returns to step S701.

In step S703, it is checked whether an attribute value indicating a facsimile-received image including at least one color page is set in the pix attr. field of the image management record selected in step S701. If the attribute value indicates that the received image is constituted by only monochromatic pages, the flow advances to step S704. If the attribute value indicates a facsimile-received image including at least one color page, the flow advances to step S709.

In step S704, it is checked by referring to the cartridge-type storage area (422) in FIG. 18 whether the loaded cartridge is a monochromatic or color cartridge. If the loaded cartridge is a monochromatic cartridge, the flow advances to step S706. If the cartridge is a color cartridge, the flow advances to step S705.

In step S705, it is checked by referring to the light-color cartridge attribute storage area (423) in FIG. 18 whether the loaded cartridge is a general color cartridge or light-color cartridge. If a general color cartridge is loaded, the flow advances to step S706. If a light-color cartridge more expensive than a general color cartridge is loaded, the flow advances to step S711 to prevent expensive inks from being used to print a facsimile image that is only required to have a resolution lower than that of a general printer image, by excluding the image management record selected in step S701 from automatic printing targets.

In step S706, each page of the image management record selected in step S701 is printed. The details of this operation will be described later.

In step S707, it is checked whether printing of each page of the image management record in step S706 is normally completed. If YES in step S707, the flow advances to step S708. If NO in step S707, the flow advances to step S711.

In step S708, the image management record for the facsimile-received image that has been normally printed is excluded from the image management record list in FIG. 9, thereby releasing the corresponding area. If the processing is completed, the flow returns to step S701.

In step S709, it is checked by referring to cartridge-type storage area (422) in FIG. 18 whether the loaded cartridge is a monochromatic or color cartridge. If a monochromatic cartridge is loaded, since a color facsimile-received image cannot be printed, the flow advances to step S711. If a color cartridge is loaded, the flow advances to step S710.

In step S710, it is checked by referring to the light-color cartridge attribute storage area (423) in FIG. 18 whether the loaded cartridge is a general color cartridge or light-color cartridge. If a general color cartridge is loaded, the flow advances to step S706. If a light-color cartridge more expensive than a general color cartridge is loaded, the flow advances to step S711 to prevent expensive inks from being used to print a facsimile image that is only required to have a resolution lower than that of a general printer image, by excluding the image management record selected in step S701 from automatic printing targets.

In step S711, an attribute value indicating an image received by memory alternate reception is set in the pix attr. field of the image management record in FIG. 9. If the processing is completed, the flow returns to step S701.

FIG. 20 is a flow chart showing the details of printing processing of pix in step S706 in FIG. 19.

In step S801, it is checked whether the start page of the image management record selected in step S701 in FIG. 19 is determined. If the page is determined, the page is selected, and the flow advances to step S802. If the page is not determined, step S801 is repeated at predetermined time intervals.

In step S802, the page selected in step S801 is printed. This operation will be described in detail later.

In step S803, it is checked whether printing of the page in step S802 is normally completed. If YES in step S803, the flow advances to step S804. If NO in step S803, the flow advances to step S807.

In step S804, a page management record of the page having undergone normal printing is excluded from the page management record list in FIG. 9, thereby releasing the corresponding area. If the processing is completed, the flow advances to step S805.

In step S805, it is checked whether the image selected in step S701 in FIG. 19 has the next page. If YES in step S805, the flow returns to step S801. If NO in step S805, the flow advances to step S806.

In step S806, the main routine in FIG. 19 is notified of information indicating normal termination, and pix printing processing is terminated.

In step S807, the main routine in FIG. 19 is notified of information indicating abnormal termination, and pix printing processing is terminated.

Figure 21:
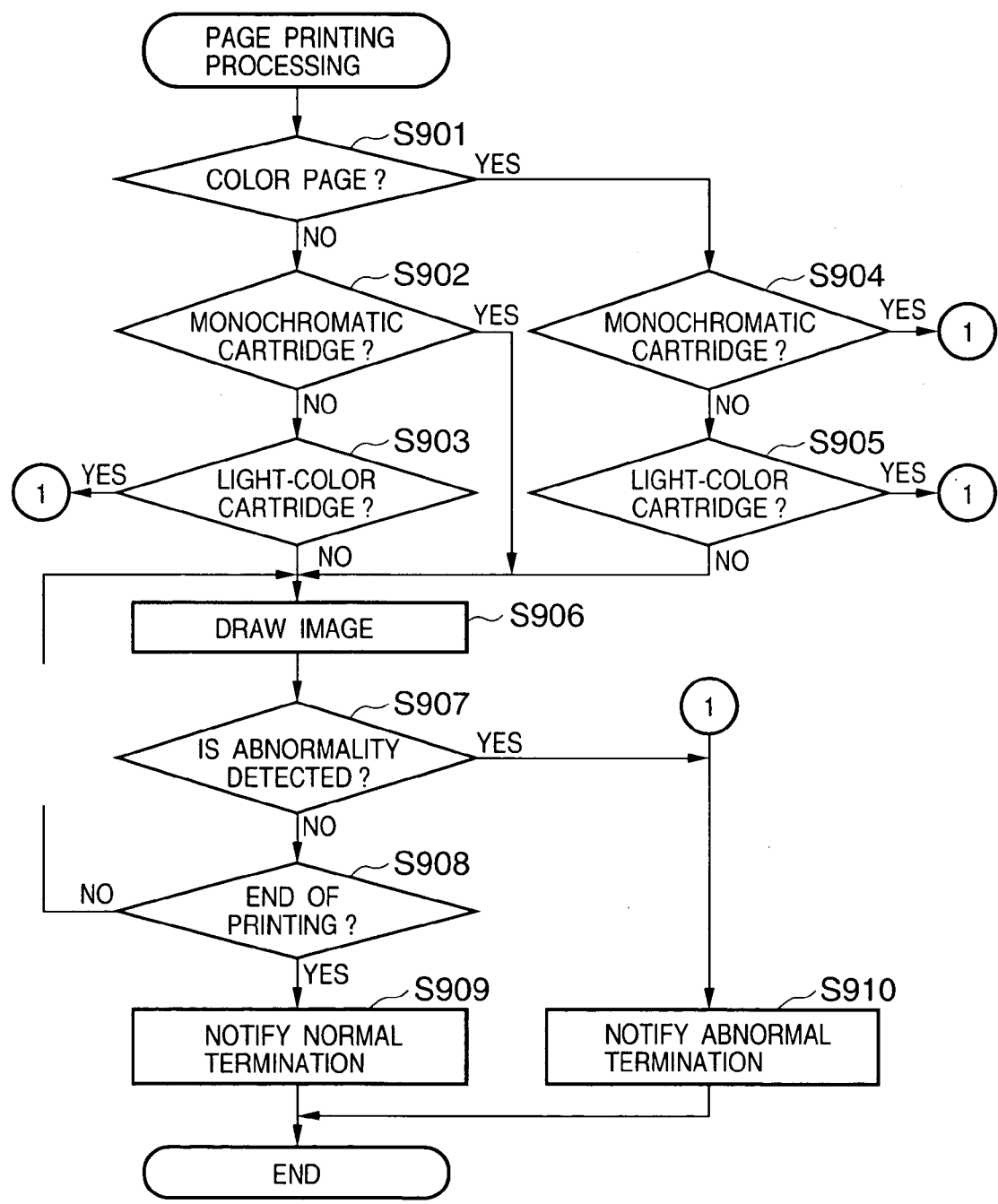
FIG. 21 is a flow chart showing the details of page printing processing in FIG. 20.

FIG. 21 is a flow chart showing the details of page printing processing in step S802 in FIG. 20.

In step S901, it is checked whether an attribute value indicating a color page is set in the page attr. field of the page management record selected in step S801 in FIG. 20. If the attribute value indicates a monochromatic page, the flow advances to step S902. If the attribute value indicates a color page, the flow advances to step S904.

In step S902, it is checked by referring to the cartridge-type storage area (422) whether the loaded cartridge is a monochromatic or color cartridge. If the loaded cartridge is a monochromatic cartridge, the flow advances to step S906. If the loaded cartridge is a color cartridge, the flow advances to step S903.

In step S903, it is checked by referring to the light-color cartridge attribute storage area (423) in FIG. 18 whether the loaded cartridge is a general color cartridge or light-color cartridge. If a general color cartridge is loaded, the flow advances to step S906. If a light-color cartridge more expensive than a general color cartridge is loaded, the flow advances to step S910 to prevent expensive inks from being used to print a facsimile image that is only required to have a resolution lower than that of a general printer image, by excluding the image management record selected in step S801 in FIG. 20 from automatic printing targets.

In step S904, it is checked by referring to the cartridge-type storage area (422) in FIG. 18 whether the loaded cartridge is a monochromatic or color cartridge. If the loaded cartridge is a monochromatic cartridge, since no color page image can be recorded, the flow advances to step S910. If the loaded cartridge is a color cartridge, the flow advances to step S905.

In step S905, it is checked by referring to the light-color cartridge attribute storage area (423) in FIG. 18 whether the loaded cartridge is a general color cartridge or light-color cartridge. If a general color cartridge is loaded, the flow advances to step S906. If a light-color cartridge more expensive than a general color cartridge is loaded, the flow advances to step S910 to prevent expensive inks from being used to print a facsimile image that is only required to have a resolution lower than that of a general printer image, by excluding the image management record selected in step S801 in FIG. 20 from automatic printing targets.

In step S906, page image information is decoded in units of lines or specific blocks, and image printing processing is performed.

In step S907, it is checked whether an error has occurred in the printing system. If YES in step S907, the flow advances to step S910. If NO in step S907, the flow advances to step S908.

In step S908, it is checked whether printing of one page is completed. If NO in step S908, the flow returns to step S906. If YES in step S908, the flow advances to step S909.

In step S909, the main routine in FIG. 20 is notified of information indicating normal termination, and the page printing processing is terminated.

In step S910, the main routine in FIG. 20 is notified of information indicating abnormal termination, and the page printing processing is terminated.

Figure 22:
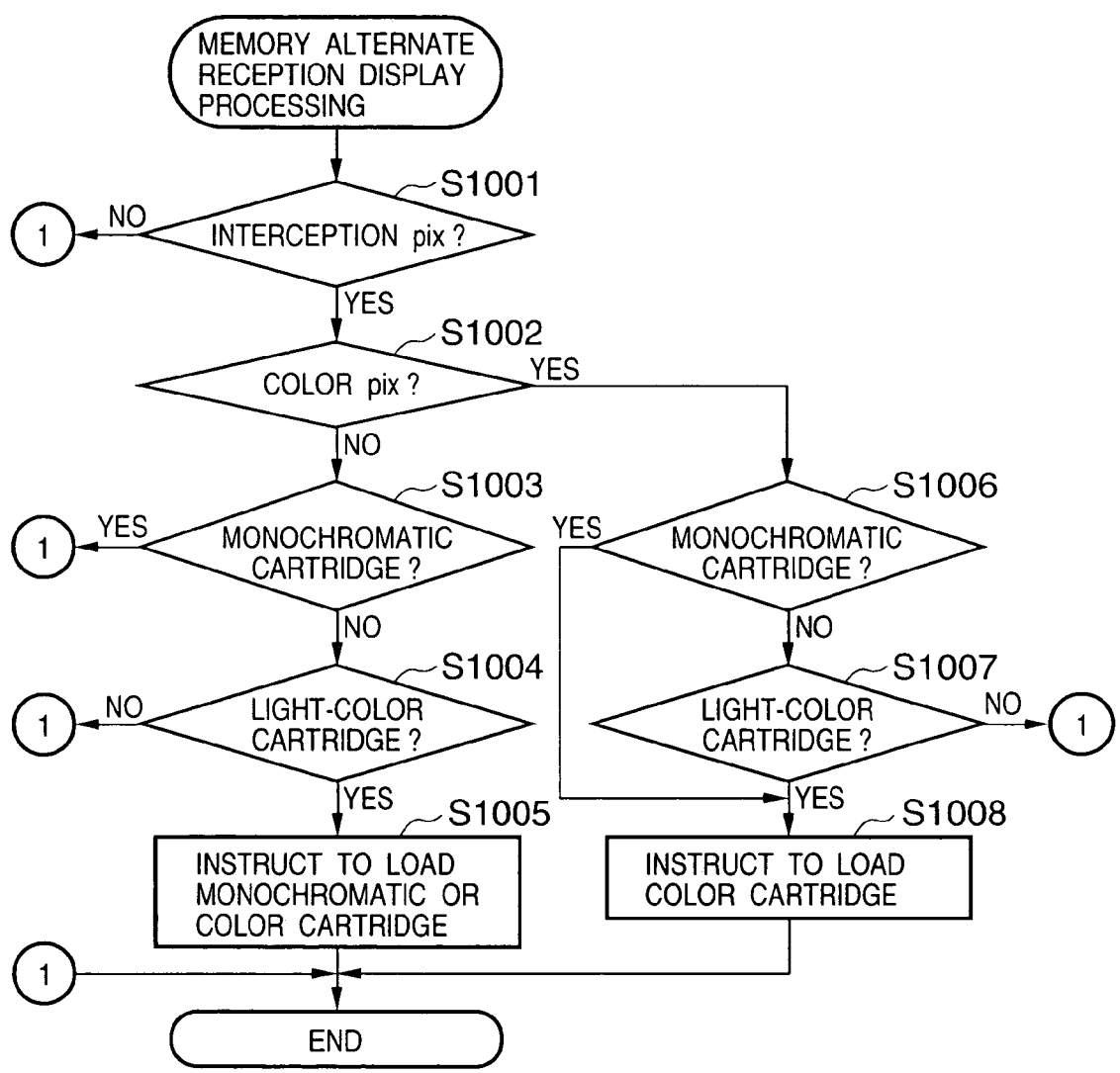
FIG. 22 is a flow chart showing processing of displaying a cause for memory alternate reception which occurs when no cartridge suitable for an image is loaded.

FIG. 22 is a flow chart showing the process of displaying information indicating the occurrence of memory alternate reception, and more specifically, the process of displaying a cause for memory alternate reception when any cartridge suitable for an image is not loaded.

Processing for display of a cause for memory alternate reception is periodically performed at predetermined time intervals. In step S1001, it is checked whether at least one image management record in which an attribute value indicating an image received by memory alternate reception is set in the pix attr. field is present in the same list. If YES in step S1002, the flow advances to step S1002. If NO in step S1002, the processing for display of a cause for memory alternate reception is terminated.

In step S1002, it is checked whether at least one image management record in which an attribute value indicating a facsimile-received image including at least one color page is set in the page attr. field in FIG. 9 in addition to the attribute value indicating the image having undergone memory alternate reception is present in the same list. If all the attribute values indicate that the received image is made up of only monochromatic pages, the flow advances to step S1003. If there is at least one image management record having an attribute value indicating that the received image includes at least one color page, the flow advances to step S1006.

In step S1003, it is checked by referring to the cartridge-type storage area (422) in FIG. 18 whether the loaded cartridge is a monochromatic or color cartridge. If a monochromatic cartridge is loaded, since no memory alternate reception due to the absence of a cartridge suitable for the image has occurred, the processing for display of a cause for memory alternate reception is terminated. If a color cartridge is loaded, the flow advances to step S1004.

In step S1004, it is checked by referring to the light-color cartridge attribute storage area (423) in FIG. 18 whether the loaded cartridge is a general color cartridge or light-color cartridge. If a general color cartridge is loaded, since no memory alternate reception due to the absence of a cartridge suitable for the image has occurred, the processing for display of a cause for memory alternate reception is terminated. If a light-color cartridge more expensive than a general color cartridge is loaded, the flow advances to step S1005.

In step S1005, information indicating that any cartridge suited to printing a monochromatic facsimile image is not loaded is displayed as a cause for memory alternate reception on the LCD (202) in FIG. 16, together with a message for prompting the operator to load a monochromatic or color cartridge. The processing for display of a cause for memory alternate reception is then terminated.

In step S1006, it is checked by referring to the cartridge-type storage area (422) in FIG. 18 whether the loaded cartridge is a monochromatic or color cartridge. If a monochromatic cartridge is loaded, the flow advances to step S1008. If a color cartridge is loaded, the flow advances to step S1007.

In step S1007, it is checked by referring to the light-color cartridge attribute storage area (423) in FIG. 18 whether the loaded cartridge is a general color cartridge or light-color cartridge. If a general color cartridge is loaded, since no memory alternate reception due to the absence of a cartridge suitable for the image has occurred, the processing for display of a cause for memory alternate reception is terminated. If a light-color cartridge more expensive than a general color cartridge is loaded, the flow advances to step S1008.

In step S1008, information indicating that any cartridge suited to printing a monochromatic facsimile image is not loaded is displayed as a cause for memory alternate reception on the LCD (202) in FIG. 16, together with a message for prompting the operator to load a general color cartridge. The processing for display of a cause for memory alternate reception is then terminated.

In the above embodiment, the facsimile reception processing shown in FIG. 8 and the automatic reception pix printing/selecting processing shown in FIG. 19 are asynchronously performed. Assume that a color image is received by memory alternate reception in the first communication because a monochromatic cartridge is loaded, and an image whose first page is monochromatic is received in the second communication. In this case, if pix data detection in step S703 in FIG. 19 is performed at this timing, printing with a monochromatic cartridge is started. If, for example, it is found that the image in the second communication includes a color page, this color page and subsequent pages are received by memory alternate reception.

With the above asynchronous processing, an image to be printed after reception can be immediately printed and erased from the memory, thus implementing an efficient system.

Third Embodiment

The principal concern of the second embodiment described above is to faithfully output a received image without using any high-cost light-color cartridge. Depending on the service condition of the apparatus, the user may want to save operation of replacing a cartridge at the expense of faithfulness (color) of a received image as long as a high-cost light-color cartridge is not used. This embodiment meets this requirement by outputting a received image with a currently loaded cartridge regardless of whether the cartridge is a color or monochromatic cartridge except when a light-color cartridge is loaded.

FIG. 23 is a view showing printing operations and notification contents which are determined in accordance with combinations of received image data and loaded cartridges in this embodiment.

More specifically, when all the pages of received image data are monochromatic pages, monochromatic printing is executed even if a color cartridge is loaded. If a light-color cartridge is loaded, the message "Replace cartridge in use with monochromatic cartridge" is displayed on the display unit 202.

Assume that received image data is composite image data including monochromatic and color images. In this case, if a monochromatic cartridge is loaded, color pages are also printed in monochrome. If a color cartridge is loaded, monochromatic/color printing is executed. If a light-color cartridge is loaded, the message "Replace cartridge in use with monochromatic cartridge" is displayed on the display unit 202.

Assume that all the pages of received image data are color pages. In this case, if a monochromatic cartridge is loaded, even color pages are printed in monochrome. If a color cartridge is loaded, color printing is executed. If a light-color cartridge is loaded, color pages are printed in light-colored inks.

The operation of this embodiment will be described next.

Figure 24:
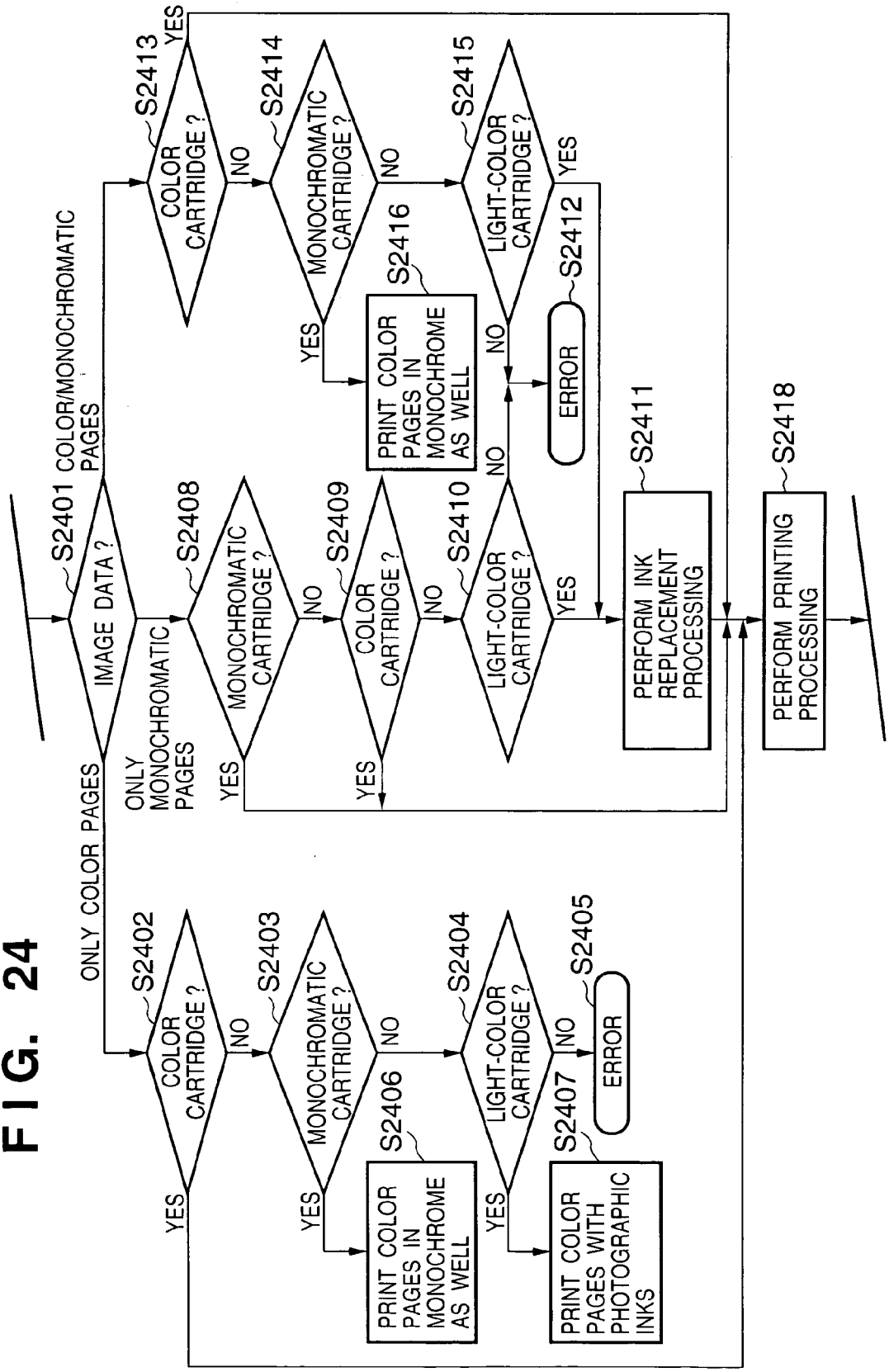
FIG. 24 is a flow chart showing operation to be performed when image data is received in the third embodiment.

FIG. 24 is a flow chart showing operation to be performed when image data is received in this embodiment.

First of all, it is checked whether all the pages of received image data correspond to color pages, monochromatic pages, or a combination of color and monochromatic pages (step S2401).

If it is determined that all the pages of the received image data are color pages (step S2401) and a color cartridge is loaded (step S2402), the flow immediately advances to the printing step (step S2418). If it is determined that a monochromatic cartridge is loaded (step S2403), a notification that all the color pages are printed in monochrome is displayed on the display unit 202 (step S2406). If it is determined that a light-color cartridge is loaded (step S2404), a notification that all the color pages are printed in photographic inks is displayed on the display unit 202 (step S2407).

Assume that all the pages of the received image data are monochromatic pages (step S2401). In this case, if it is determined that a monochromatic cartridge is loaded (step S2408), the flow immediately advances to the printing step (step S2418). If a color cartridge is loaded (step S2409), a notification that all the monochromatic pages are printed in monochrome with a color cartridge is displayed on the display unit 202, and the flow advances to the printing step (step S2418). If it is determined that a light-color cartridge is loaded (step S2410), a notification prompting the operator to replace the cartridge with a monochromatic cartridge because photographic inks are expensive is displayed on the display unit 202 (step S2411). If the operator replaces the cartridge with an appropriate cartridge (manually) in accordance with this notification, printing processing is performed after replacement (step S2418).

Assume that the received image data include both color and monochromatic pages (step S2413). In this case, if it is determined that the loaded cartridge is a color cartridge (step S2413), since both color and monochromatic pages can be printed by the color cartridge, the step immediately advances to the printing step (step S2418). If it is determined that a monochromatic cartridge is loaded (step S2414), a notification that color pages are printed in monochrome is displayed on the display unit 202 (step S2416). If it is determined that a light-color cartridge is loaded (step S2415), a notification prompting the operator to replace the cartridge with a monochromatic cartridge because photographic inks are expensive is displayed on the display unit 202 (step S2411).

In the above embodiment, it is checked whether all the pages of received image data correspond to color pages, monochromatic pages, or a combination of color and monochromatic pages. Instead of the received image data, however, read image data read by a read sensor 48, sheet scanner 112, or the like may be used.

As a communication apparatus using the image forming apparatus of the present invention, a facsimile apparatus has been described. Obviously, however, the present invention can be applied to other types of apparatuses. In addition, an arbitrary image data source can be used, and image data can be received from an arbitrary medium and apparatus and can be output.

In addition to the method of detecting the type of cartridge by using a printer state variable, another method may be used. In this method, projections or the like are formed on cartridges, and the numbers and positions of projections or the like vary depending on the types of cartridges, thereby allowing a cartridge-type determination sensor (not shown) to determine the type of a loaded cartridge.

In the embodiment described above, an attribute value indicating a facsimile-received image constituted by only monochromatic pages and an attribute value indicating a facsimile-received image including at least one color page are set in a field (pix attr.) of an image management record, and an attribute value indicating a monochromatic page and an attribute value indicating a color page are also set in a field (page attr.) of a page management record. Of these fields, the field (pix attr.) of the image management record is prepared to collectively and easily identify the attributes of the respective pages constituting a received image as a processing target in step S103.

Figure 10:
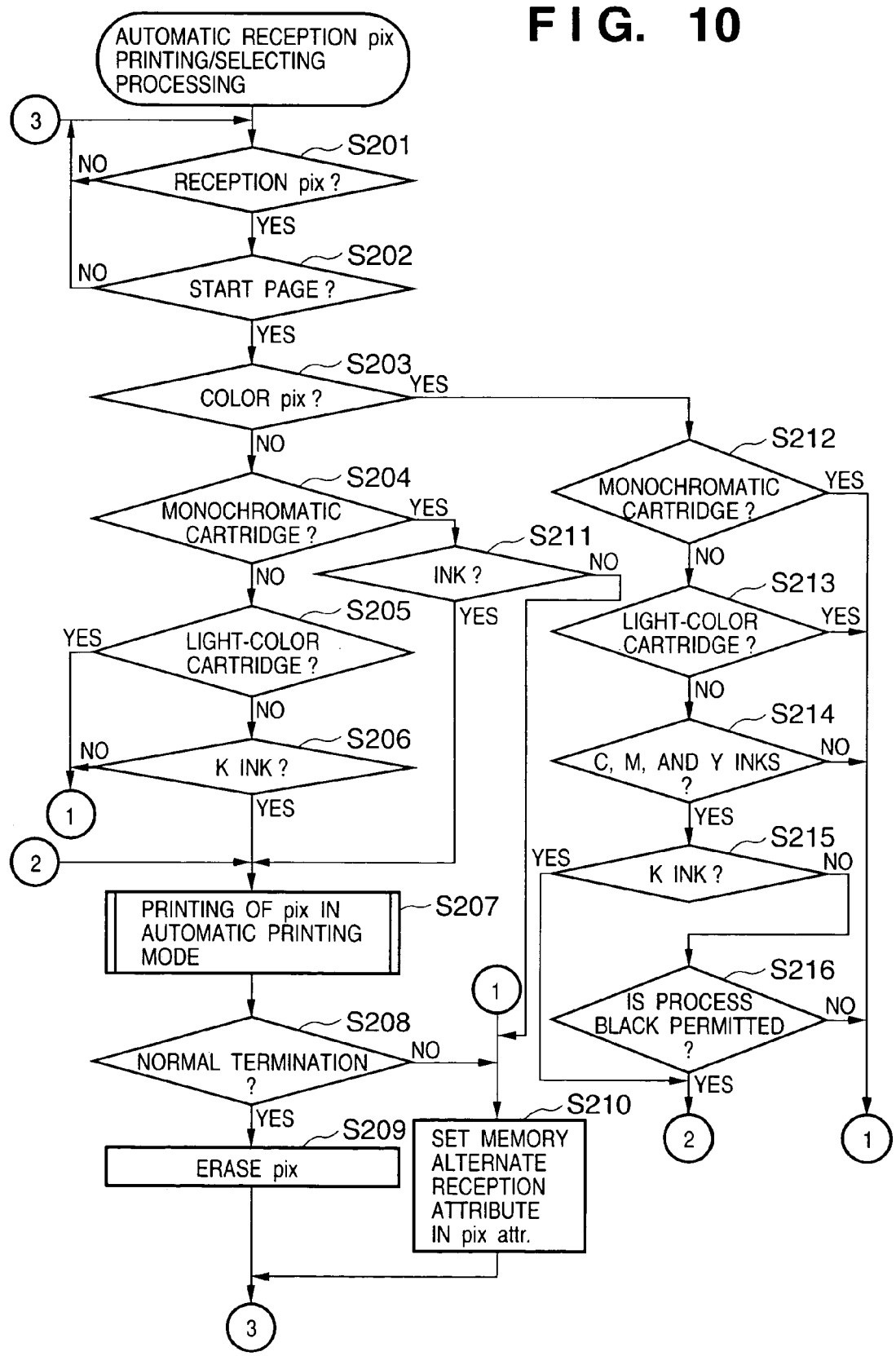
FIG. 10 is a flow chart showing automatic printing processing for a facsimile-received image.

Even if, however, facsimile reception processing (steps S102 and S108) in which an attribute value indicating a facsimile-received image constituted by only monochromatic pages and an attribute value indicating a facsimile-received image including at least one color page are set in the field (pix attr.) of an image management record is omitted, and all the attributes of the respective pages constituting a received image as a processing target are checked in step S203 in FIG. 10, step S703 in FIG. 19, and step S1002 in FIG. 22, the same effects as those in the above embodiment can be obtained.

In addition, even if, for example, facsimile reception processing (steps S105 and S107) in which an attribute value indicating a monochromatic page and an attribute value indicating a color page are set in the page attr. field of a page management record is omitted, the same effects as those in the above embodiment can be obtained by using the attribute value in the pix attr. field of an image management record in place of the page attr. field of a page management record as a target in step S901 of FIG. 21, although all pages of an image including monochromatic and color pages are processed as color pages.

In the above embodiment, as a mechanism for allowing the user to select a printing capability, an arrangement for allowing the user to exclusively load one of a cartridge dedicated to monochromatic printing, color printing cartridge, and photographic printing cartridge (light-color cartridge) of the ink-jet scheme has been described. The present invention can also be applied to even a printing unit having a mechanism for allowing the user to exclusively load one of a cartridge dedicated to monochromatic printing and color printing cartridge of the ink-jet scheme, and the first object of the present invention can be achieved by configuring the printing unit to skip all the steps of checking a light-color cartridge in the above embodiment.

In the above embodiment, all the inks constituting a light-color cartridge are assumed to be different from those constituting a general color cartridge, and each cartridge itself is replaced. If, however, a light-color cartridge configured to add light-colored inks to a general color cartridge is used, automatic printing can be implemented by using inks common to the general color cartridge.

In this case, if a light-color cartridge is detected in step S710 of FIG. 19 in the second embodiment, the flow may advance to step S706 after settings are made to use only the same inks as those of a general color cartridge. Likewise, if loading of a light-color cartridge is detected in step S905 of FIG. 21, the flow may advance to step S906 to print an image after settings are made to use only the same inks as those of a general color cartridge. In addition, in step S1007 of FIG. 22, the processing may be terminated after settings are made to use only the same inks as those of a general color cartridge.

If a general color cartridge or light-color cartridge is configured to replace an ink of each color and has a black ink, the apparatus can be configured to perform automatic printing by using only black ink in the color cartridge upon receiving a monochromatic image.

In this case, if, for example, a light-color cartridge is detected in step S705 of FIG. 19, the flow may advance to step S706 after settings are made to use only black ink (in the case of a general color cartridge as well, color ink consumption can be suppressed by making the same settings as those described above). Likewise, if loading of a light-color cartridge is detected in step S903 of FIG. 21, the flow may advance to step S906 after settings are made to use only black ink (in the case of a general color cartridge as well, color ink consumption can be suppressed by making the same settings as those described above). In this embodiment, there is no need to display the cartridge replacement instruction shown in FIG. 22.

In each embodiment described above, the facsimile apparatus using the ink-jet printing unit has been exemplified. However, the present invention is not limited to this. For example, if an electrophotographic laser beam color printer is used for the printing unit, and the printer has a mechanism of allowing the user to selectively load a toner cartridge for monochromatic printing, a color toner cartridge for general color printing, or an ultra-fine color toner cartridge for high-precision printing, the first object of the present invention can be achieved by applying the present invention to the printing unit.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,73,129 and 4,740,796 is preferable. The above system is applicable to either one of the so-called on-demand type and continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full-line-type printhead having a length corresponding to the width of a maximum printing medium which can be printed by the printer, either the arrangement which satisfies the full-line length by combining a plurality of printheads as disclosed in the above specification or the arrangement as a signal printhead obtained by forming printheads integrally can be used.

In addition, not only an exchangeable chip-type printhead, as described in the above embodiment, which can be electrically connected to the apparatus main unit and can receive an ink from the apparatus main unit upon being mounted on the apparatus main unit but also a cartridge-type printhead in which an ink tank is integrally arranged on the printhead itself, can be applicable to the present invention.

It is preferable to add recovery means for the printhead, preliminary auxiliary means, and the like provided as an arrangement of the printer of the present invention since the printing operation can be further stabilized. Examples of such means include, for printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature or an ink which liquefies upon application of a use printing signal, since it is a general practice to perform temperature control of the ink itself within a range from 30° C. to 70° C. in the in-jet system, so that the ink viscosity can fall within a stable discharge range.

In addition, in order to prevent a temperature rise caused by hat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers which are heated in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the printer of the present invention may be used in the form of a copying machine combined with a reader and the like in addition to an image output terminal of an information processing equipment such as a computer.

The present invention can be applied to a system constituted by a plurality of devices (e.g., host computer, interface, reader, printer) or to an apparatus comprising a signal device (e.g., copying machine, facsimile machine).

Further, the object of the present invention can also be achieved by providing a storage medium (or recording medium) storing program codes for implementing the aforesaid function of the above embodiments to a system or apparatus, reading the program codes, by a computer (CPU or MPU) of the system or apparatus, from the storage medium, then executing the program. In this case, the program codes read from the storage medium realize the functions according to the embodiments, and storage medium storing the program codes constitutes the invention. Furthermore, besides aforesaid functions according to the above embodiment are realized by executing the program codes which are read by a computer, the present invention includes a case where an OS (operating system) or the like working on the computer performs a part or entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As has been described above, according to the present invention, in receiving and printing images such as monochromatic and color facsimile images, a received image is discriminated as a color or monochromatic image, and the printing capability currently selected in the printing unit, which can perform printing by selecting one of a plurality of printing capabilities, is discriminated. In accordance with these discrimination results, control is performed to automatically print the received image by using the printing unit or store the image in a storage means such as an image memory. The present invention therefore has the effect of performing optimal printing operation for the type of received image and the printing capability currently set.

Assume that a printing capability is selected depending on which one of the following types of cartridges containing various inks used for the ink-jet printhead is loaded: the first cartridge containing a black ink dedicated to monochromatic printing, the second cartridge containing magenta, cyan, yellow, and black inks for color printing, and the third cartridge containing magenta, cyan, yellow, and black inks which differ in density from the color inks in the second cartridge and are used for high-quality image printing. In this case, control can be performed to automatically print a received image or store it in the image memory depending on which type of cartridge is loaded. With this control, if, for example, the third cartridge is loaded, and a monochromatic image is received, the image can be stored in the image memory without performing automatic printing.

This control makes it possible to suppress wasteful consumption of ink unsuitable for printing of a received image.

In addition, in detecting the remaining amounts of inks in these cartridges, when, for example, the second cartridge is loaded, and a monochromatic image is stored, control can be performed to detect only the remaining amount of black ink. This prevents detection of the remaining amounts of other inks that are not required for printing, thereby suppressing unnecessary ink consumption and greatly contributing to a reduction in the running cost of the apparatus.

In addition, according to the present invention, in an image forming apparatus which has an image forming unit allowing the user to select a cartridge dedicated to monochromatic printing, a cartridge for color printing, or a cartridge for photographic printing, and is capable of forming monochromatic and color images, and a communication apparatus using the image forming apparatus, received images can be automatically output, where possible, while unintentional conversion from received color images to monochromatic images is prevented, and the running cost is reduced by suppressing printing of received images using expensive inks.

Furthermore, if a given image cannot be automatically output, the user can be notified of the corresponding information.

Furthermore, the present invention can be applied to the system comprising either a plurality of units or a single unit. It is needless to say that the present invention can be applied to the case which can be attained by supplying programs which execute the process defined by the present system or invention.

What is claimed is:

1. A facsimile apparatus comprising:
    a recording unit which is capable of printing a received facsimile image by selectively using a first unit for color image printing and a second unit for high-quality color image printing; and
    a control unit adapted to control the recording unit to print a received color facsimile image not by the second unit, but by the first unit,
    wherein either one of the first unit and second unit is selectively loaded to the recording unit and wherein the control unit controls the facsimile to store a received facsimile image in a storage unit if the second unit has been loaded to the recording unit.

2. The facsimile apparatus according to claim 1, wherein the first unit comprises a plurality of containers respectively containing cyan, magenta, and yellow printing agents, and the second unit comprises a plurality of containers respectively containing high-quality cyan, magenta, and yellow printing agents, suitable for high-quality image printing, which differ in density from the printing agents contained in the first unit.

3. The facsimile apparatus according to claim 2, wherein the printing agents and high-quality printing agents are inks.

4. The facsimile apparatus according to claim 2, wherein the first unit further comprises a container containing black printing agents and the second unit further comprises a container containing high-quality black printing agents, suitable for high-quality image printing, which differ in density from the black printing agent contained in the first unit.

5. The facsimile apparatus according to claim 2, wherein the first unit is capable of printing by using process black, and wherein the control unit uses the first unit for printing a received monochrome facsimile image and controls the first unit to print the received monochrome facsimile image by using process black.

6. A method of controlling a facsimile apparatus, the method comprising the steps of:
    printing a received facsimile image by selectively using a first unit for color image printing and a second unit for high-quality color image printing;
    controlling the facsimile apparatus to print, in the printing step, a received color facsimile image not by the second unit, but by the first unit;
    selectively loading either one of the first unit and second unit to the facsimile apparatus; and
    storing a received facsimile image in a storage unit if the second unit has been loaded to the facsimile apparatus.

7. A method according to claim 6, wherein the first unit comprises a plurality of containers respectively containing cyan, magenta, and yellow printing agents, and the second unit comprises a plurality of containers respectively containing high-quality cyan, magenta, and yellow printing agents, suitable for high-quality image printing, which differ in density from the printing agents contained in the first unit.

8. A method according to claim 7, wherein the printing agents and high-quality printing agents are inks.

9. A method according to claim 7, wherein, in the printing step, the first unit includes a container containing black printing agent and the second unit includes a container containing high-quality black printing agents, suitable for high-quality image printing, which differ in density from the black printing agent contained in the first unit.

10. A method according to claim 7, wherein the first unit is capable of printing by using process black, and wherein the printing step uses the first unit for printing a received monochrome facsimile image, using process black.

11. A computer program comprising computer code for controlling a facsimile apparatus to perform the steps of:
    printing a received facsimile image by selectively using a first unit for color image printing and a second unit for high-quality color image printing;
    controlling the facsimile apparatus to print, in the printing step, a received color facsimile image not by the second unit, but by the first unit;
    selectively loading either of the first unit and second unit to the facsimile apparatus; and
    storing a received facsimile image in a storage unit if the second unit has been loaded to the facsimile apparatus.

12. A computer program according to claim 11, wherein the first unit comprises a plurality of containers respectively containing cyan, magenta, and yellow printing agents, and the second unit comprises a plurality of containers respectively containing high-quality cyan, magenta, and yellow printing agents, suitable for high-quality image printing, which differ in density from the printing agents contained in the first unit.

13. A computer program according to claim 12, wherein the printing agents and high-quality printing agents are inks.

14. A computer program according to claim 12, wherein, in the printing step, the first unit includes a container containing black printing agent and the second unit includes a container containing high-quality black printing agents, suitable for high-quality image printing, which differ in density from the black printing agent contained in the first unit.

15. A computer program steps according to claim 12, wherein the first unit is capable of printing by using process black, and wherein the printing step uses the first unit for printing a received monochrome facsimile image, using process black.

* * * * *

UNITED STATES PATENT AND TRADEMARK OFFICE
CERTIFICATE OF CORRECTION

PATENT NO. : 6,937,360 B1
DATED : August 30, 2005
INVENTOR(S) : Atsushi Ikeda et al.

It is certified that error appears in the above-identified patent and that said Letters Patent is hereby corrected as shown below:

Column 7,
Line 51, "server" should read -- serve --.

Column 11,
Lines 51-52, the two paragraphs should be combined.

Column 18,
Line 19, "can" should read -- can be --.

Column 31,
Line 30, "hat" should read -- heat --.

Signed and Sealed this

Eleventh Day of April, 2006

JON W. DUDAS
*Director of the United States Patent and Trademark Office*